(12) United States Patent
Cruz Mota et al.

(10) Patent No.: US 11,005,728 B2
(45) Date of Patent: *May 11, 2021

(54) DESIGNATING A VOTING CLASSIFIER USING DISTRIBUTED LEARNING MACHINES

(71) Applicant: Cisco Technology, Inc., San Jose, CA (US)

(72) Inventors: Javier Cruz Mota, Assens (CH); Jean-Philippe Vasseur, Saint Martin d'Uriage (FR); Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/564,176

(22) Filed: Sep. 9, 2019

(65) Prior Publication Data

US 2020/0007412 A1  Jan. 2, 2020

Related U.S. Application Data

(63) Continuation of application No. 14/273,108, filed on May 8, 2014.

(51) Int. Cl.
*H04L 12/24* (2006.01)
*H04L 29/06* (2006.01)
(Continued)

(52) U.S. Cl.
CPC .......... *H04L 41/30* (2013.01); *G06Q 10/10* (2013.01); *G07C 13/00* (2013.01); *H04L 12/16* (2013.01); *H04L 12/185* (2013.01); *H04L 43/00* (2013.01); *H04L 63/20* (2013.01); *H04W 12/1205* (2019.01); *G06Q 2230/00* (2013.01); *H04K 3/22* (2013.01); *H04K 2203/18* (2013.01);
(Continued)

(58) Field of Classification Search
None
See application file for complete search history.

(56) References Cited

U.S. PATENT DOCUMENTS 7,873,583 B2   1/2011  Laxman et al.
8,103,727 B2   1/2012  Lin
(Continued)

OTHER PUBLICATIONS

Bankovic et al., "Detecting Unknown Attacks in Wireless Sensor Networks That Contain Mobile Nodes", Sensors 2012, 12, 10834-10850.
(Continued)

*Primary Examiner* — Alexey Shmatov
*Assistant Examiner* — Robert Bejcek, II
(74) *Attorney, Agent, or Firm* — Behmke Innovation Group LLC; James M. Behmke; Jonathon P. Western

(57) ABSTRACT

In one embodiment, possible voting nodes in a network are identified. The possible voting nodes each execute a classifier that is configured to select a label from among a plurality of labels based on a set of input features. A set of one or more eligible voting nodes is selected from among the possible voting nodes based on a network policy. Voting requests are then provided to the one or more eligible voting nodes that cause the one or more eligible voting nodes to select labels from among the plurality of labels. Votes are received from the eligible voting nodes that include the selected labels and are used to determine a voting result.

20 Claims, 23 Drawing Sheets

(51) Int. Cl.
*G07C 13/00* (2006.01)
*H04L 12/16* (2006.01)
*G06Q 10/10* (2012.01)
*H04L 12/26* (2006.01)
*H04L 12/18* (2006.01)
*H04W 12/12* (2021.01)
*H04K 3/00* (2006.01)
*H04L 29/08* (2006.01)

(52) U.S. Cl.
CPC ...... *H04L 63/1425* (2013.01); *H04L 63/1458* (2013.01); *H04L 67/12* (2013.01)

(56) References Cited

U.S. PATENT DOCUMENTS

| | | | |
|---|---|---|---|
| 8,370,928 | B1 | 2/2013 | Motwani et al. |
| 8,504,504 | B2 | 8/2013 | Liu |
| 2003/0061092 | A1 | 3/2003 | Dutta et al. |
| 2005/0286772 | A1 | 12/2005 | Albertelli |
| 2008/0270389 | A1 | 10/2008 | Jones et al. |
| 2012/0026938 | A1 | 2/2012 | Pandy et al. |

OTHER PUBLICATIONS

Dietterich, T. G., "Ensemble Methods in Machine Learning", In Multiple Classifier Systems. MCS 2000. Lecture Notes in Computer Science, vol. 1857, Dec. 2000, pp. 1-15, Springer Berlin Heidelberg.
Gnawali, et al., "The Minimum Rank with Hysteresis Objective Function", Request for Comments 6719, Sep. 2012, 13 pages, Internet Engineering Task Force Trust.
Gorodetskiy, et al., "Methods and Algorithms of Collective Recognition", Automation and Remote Control, 2008, vol. 69, No. 11, pp. 1821-1851.
Hsu, et al., "Diversity in Combinations of Heterogeneous Classifiers", T. Theeramunkong et al. (Eds), PAKDD 2009, LNAI 5476, pp. 923-932, 2009.
International Search Report and Written Opinion dated Jul. 31, 2015 in connection with PCT/US2015/028132.
Jannotti, et al., "Overcast: Reliable Multicasting with an Overlay Network", OSDI'00, Proceedings of the 4$^{th}$ Conference on Symposium on Operating System Design and Implementation, vol. 4, No. 14, Oct. 2000, 16 pages.
Ko, et al., "From Dynamic Classifier Selection to Dynamic Ensemble Selection", Pattern Recognition 41, 2008, pp. 1718-1731.
Ortega, et al., "Arbitrating Among Competing Classifiers Using Learned Referees", Knowledge and Information Systems, 2001, 3: pp. 470-490.
Ruta, et al., "Classifier Selection for Majority Voting", Information Fusion 6, 2005, 63-81.
Shen, et al., "Ensemble Classifier for Protein Fold Pattern Recognition", BioInformatics vol. 2, No. 14, 2006, pp. 1717-1722.
Thubert, P., "Objective Function Zero for the Routing Protocol for Low-Power and Lossy Networks (RPL)", Request for Comments 6552, Mar. 2012, 14 pages, Internet Engineering Task Force Trust.
Vasseur, et al., "Routing Metrics Used for Path Calculation in Low-Power and Lossy Networks", Request for Comments 6551, Mar. 2012, 30 pages, Internet Engineering Task Force Trust.
Wikipedia, "Ensemble Learning", http://en.wikipedia.org/wiki/Ensemble_learning, 10 pages, Mar. 21, 2014, Wikimedia Foundation, Inc.
Winter; et al., "RPL: IPv6 Routing Protocol for Low-Power and Lossy Networks", Internet Engineering Task Force, Request for Comments 6550, Mar. 2012, 157 pages.

DESIGNATING A VOTING CLASSIFIER USING DISTRIBUTED LEARNING MACHINES

RELATED APPLICATION

This application is continuation of U.S. patent application Ser. No. 14/273,108, filed on May 8, 2014, entitled DESIGNATING A VOTING CLASSIFIER USING DISTRIBUTED LEARNING MACHINES, by Javier Cruz Mota, et al., the contents of which are incorporated by reference herein.

TECHNICAL FIELD

The present disclosure relates generally to computer networks, and, more particularly, to designating a voting classifier using distributed learning machines.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

One type of network attack that is of particular concern in the context of LLNs is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. The detection of DoS attacks is particularly challenging in the context of LLNs, where the network is typically more susceptible to external conditions, under greater resource constraints, and more dynamic than a traditional network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
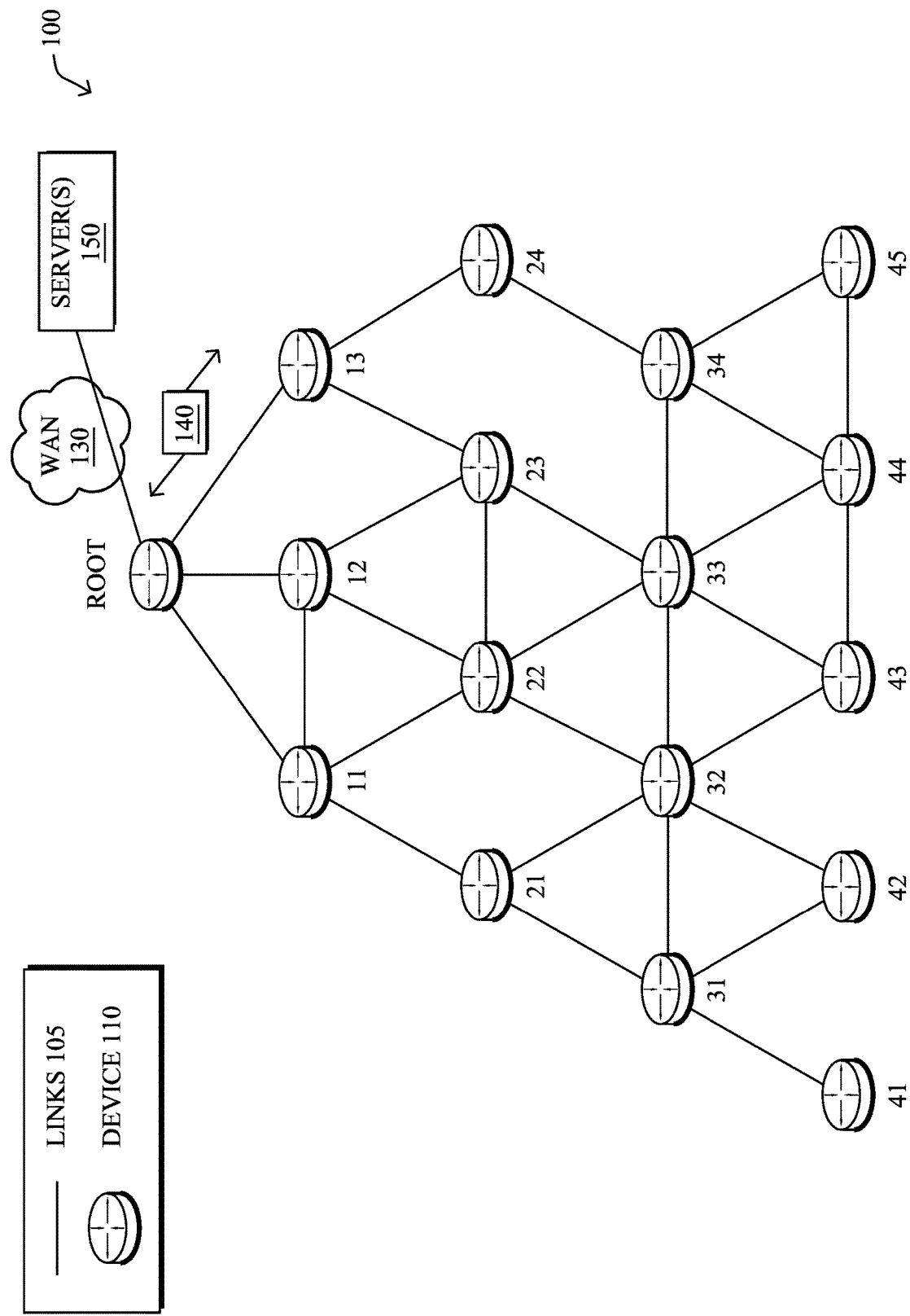
FIG. 1 illustrates an example communication network.

According to one or more embodiments of the disclosure, possible voting nodes in a network are identified. The possible voting nodes each execute a classifier that is configured to select a label from among a plurality of labels based on a set of input features. A set of eligible voting nodes is selected from among the possible voting nodes based on a network policy. Voting requests are then provided to the eligible voting nodes that cause the eligible voting nodes to select labels from among the plurality of labels. Votes are received from the eligible voting nodes that include the selected labels and are used to determine a voting result.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
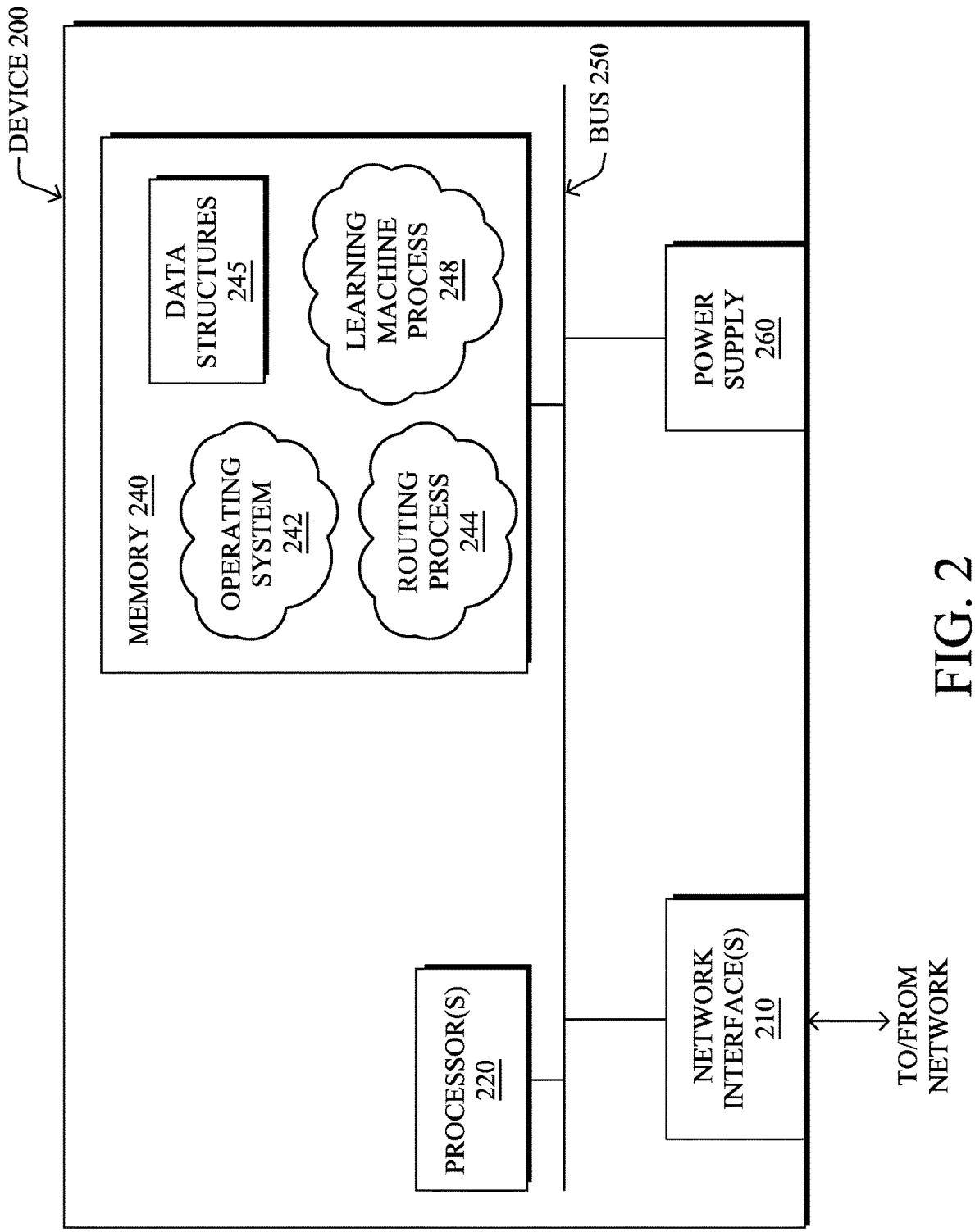
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine processes to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Learning machine process 248 includes computer executable instructions executed by the processor 220 to perform various functions, such as attack detection and reporting. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.).

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
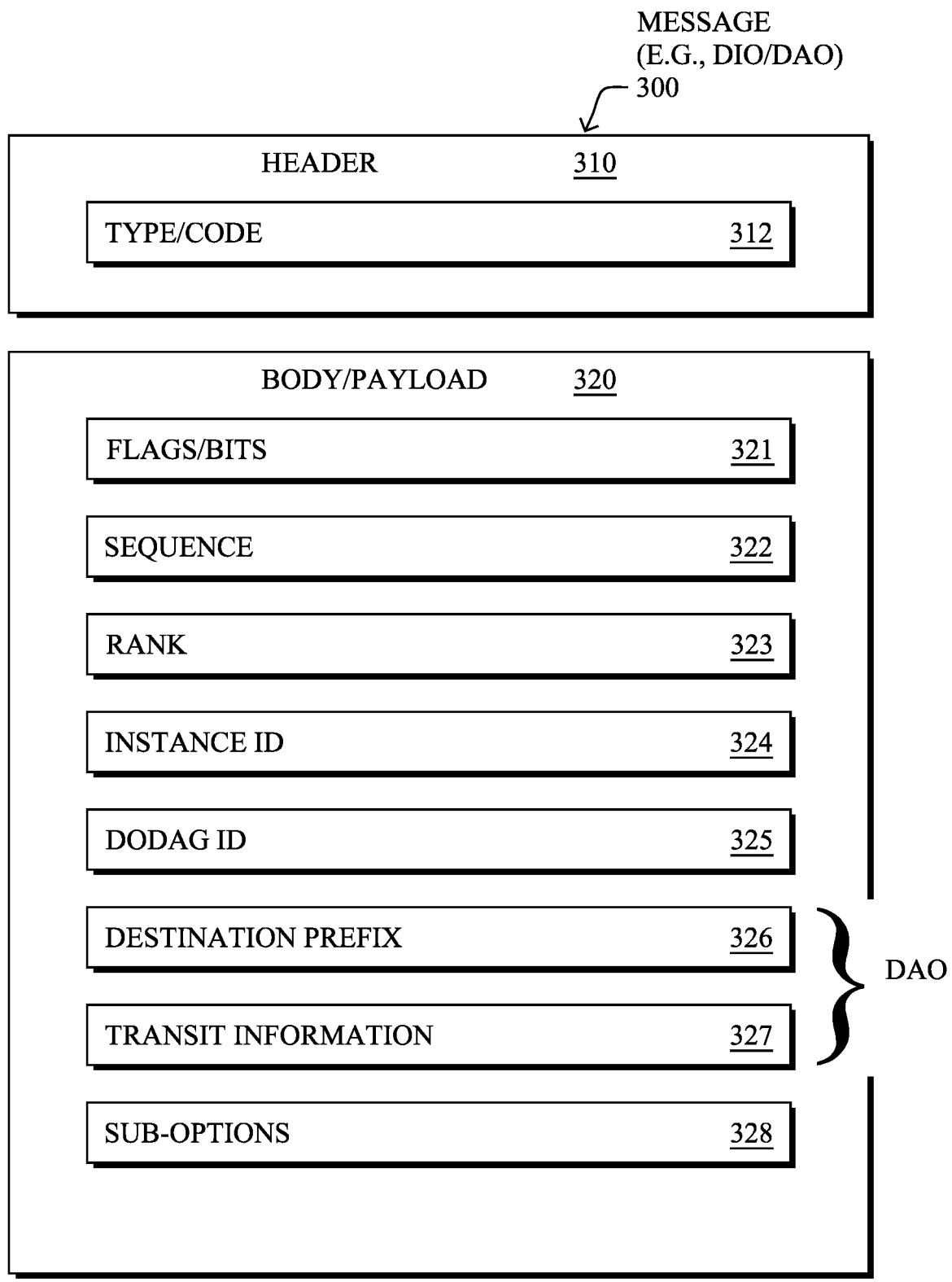
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
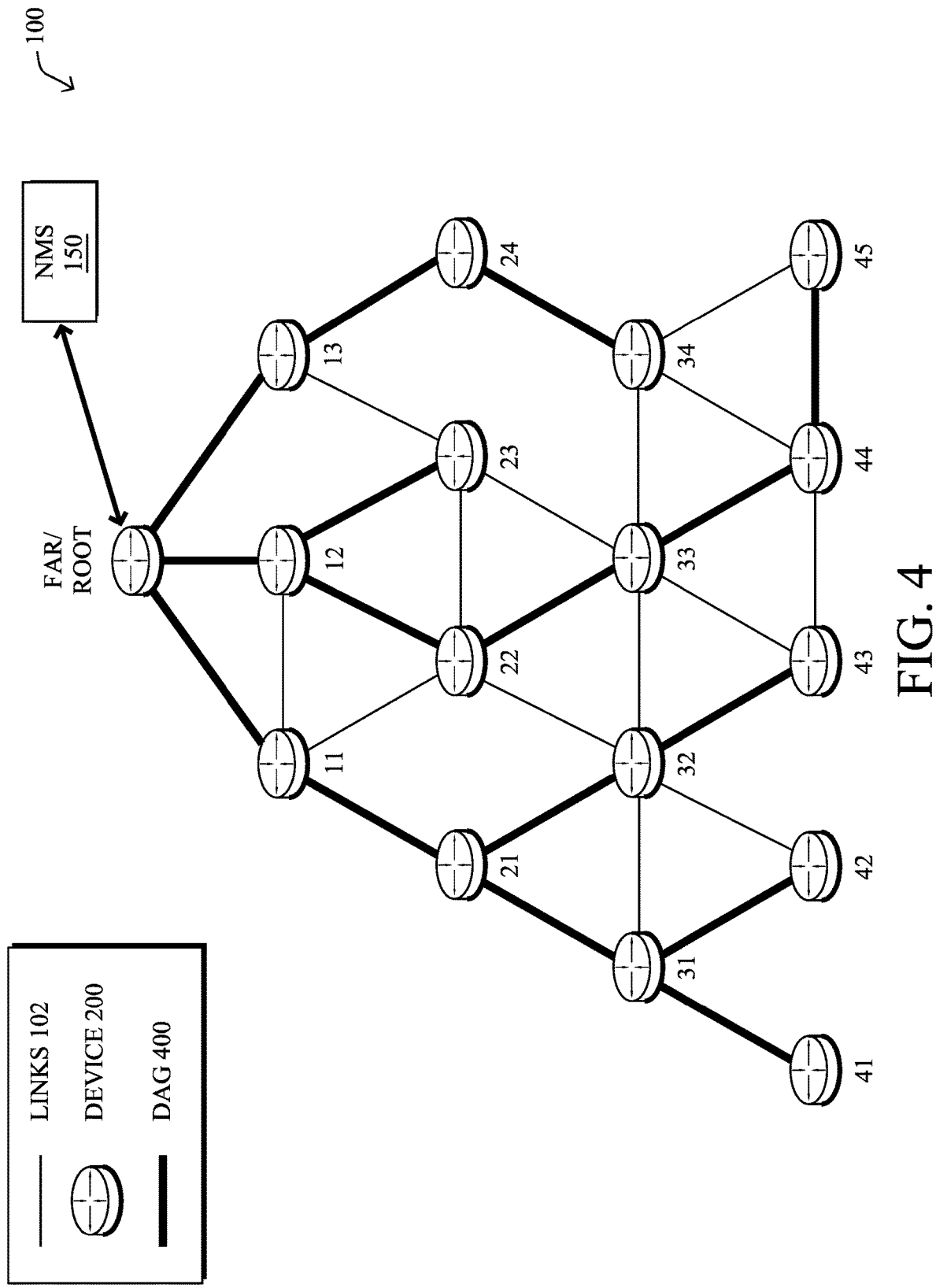
FIG. 4 illustrates an example directed acyclic graph (DAG) in the communication network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Figure 5A:
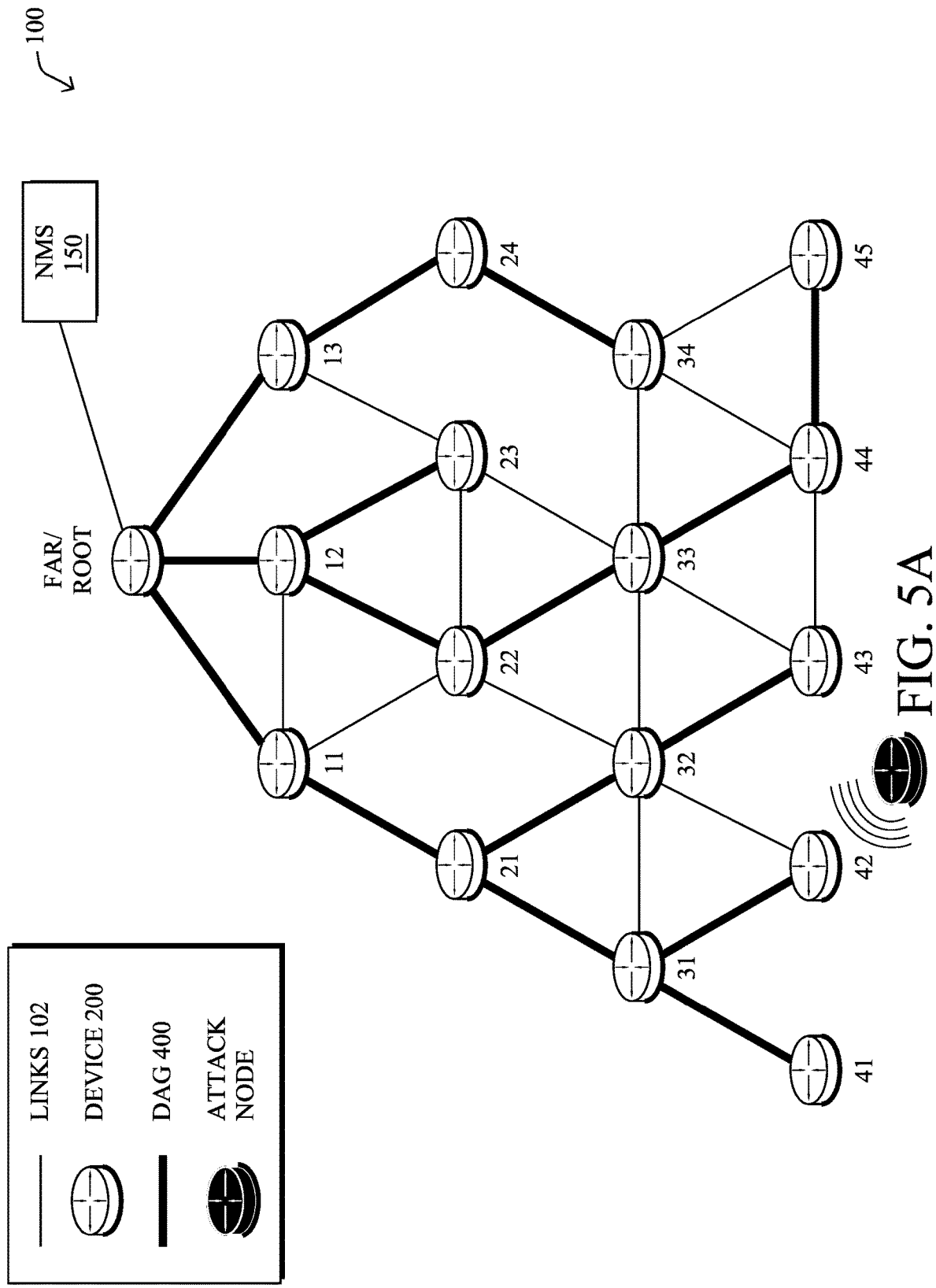
FIGS. 5A-5C illustrate an example of the detection and reporting of a potential network attack.
Figure 5B:
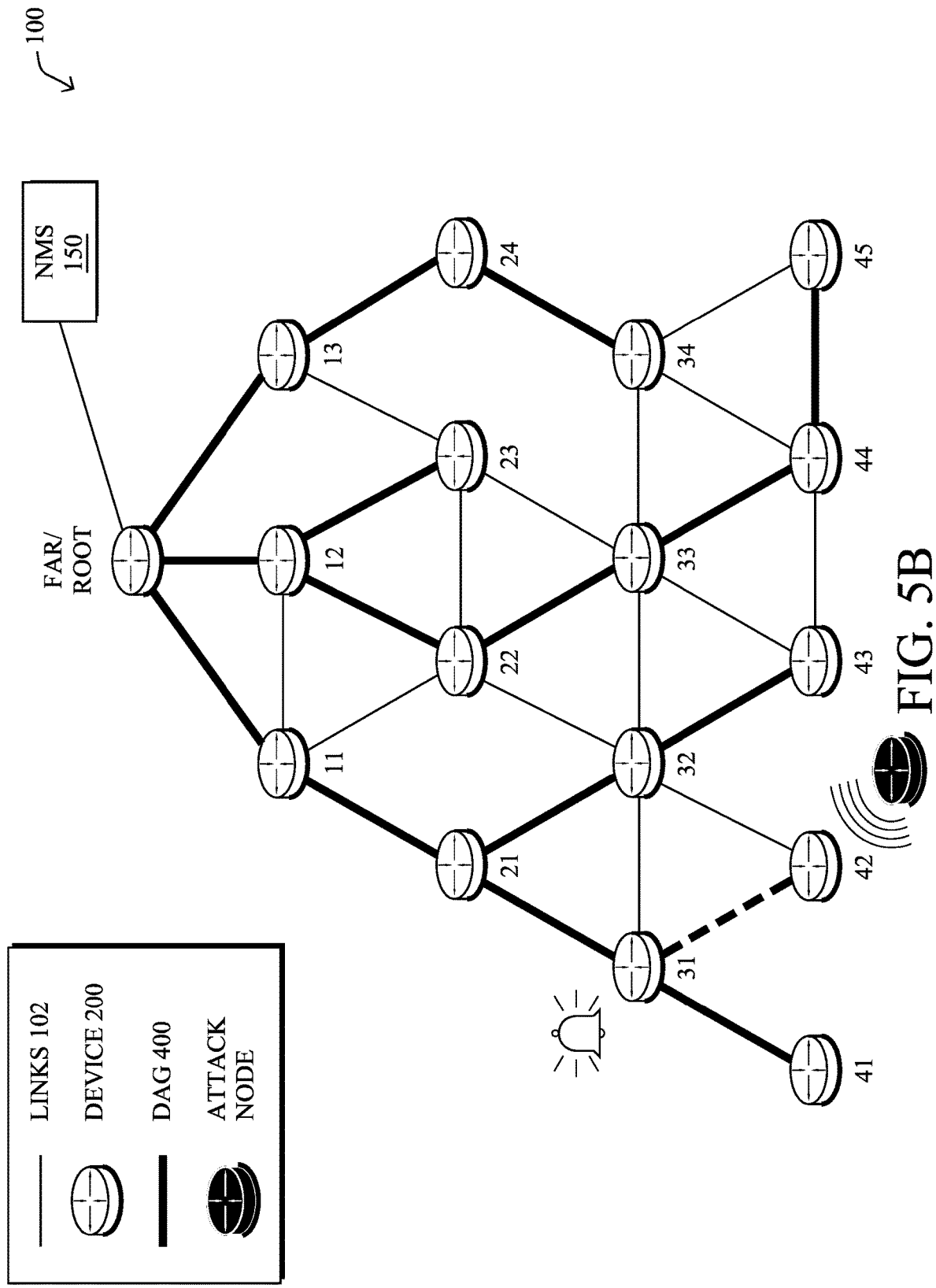
Figure 5C:
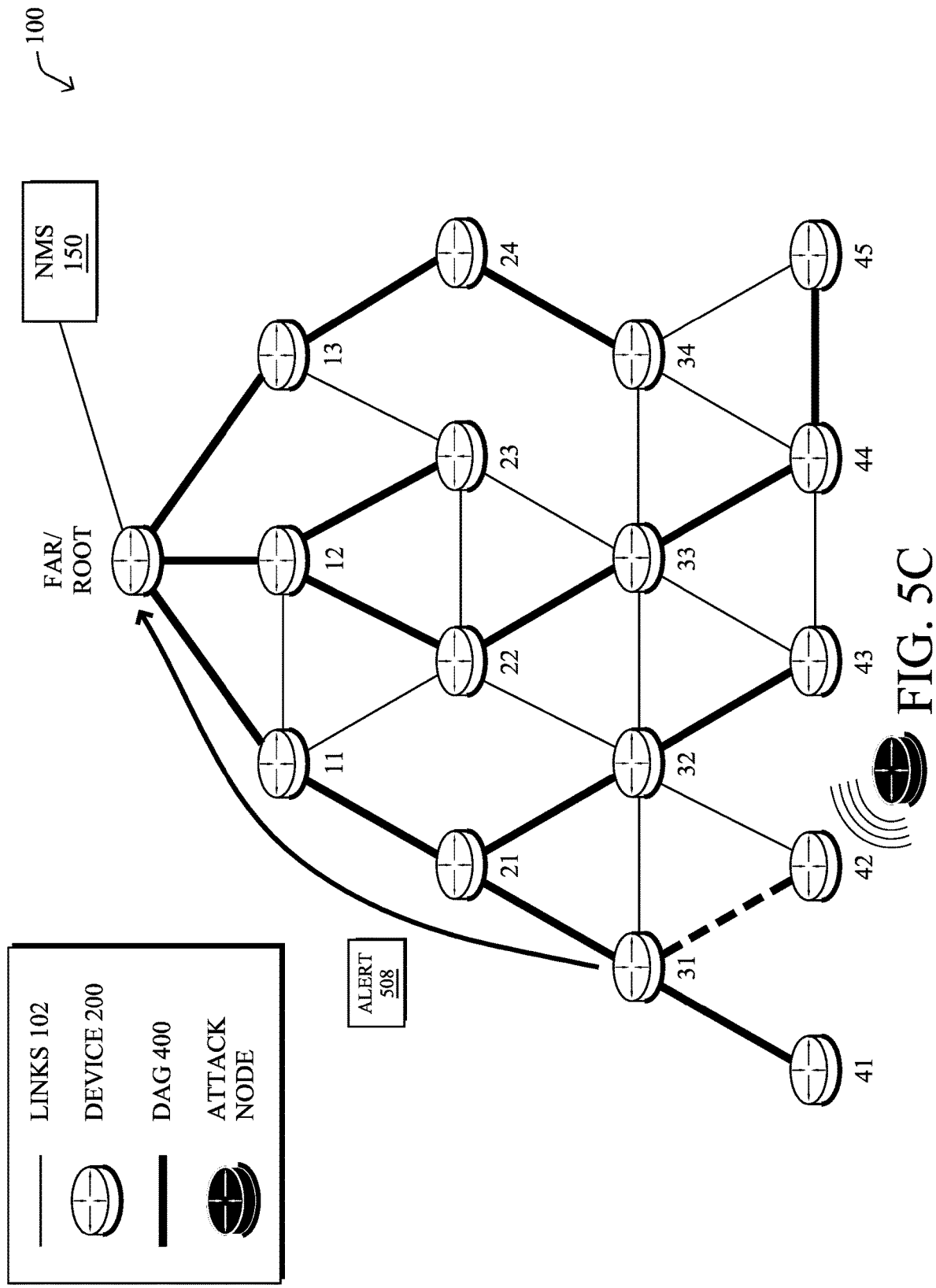

Referring now to FIGS. 5A-5C, an example is illustrated of a network attack being detected and reported within network 100. Any or all of the nodes/devices 200 shown may execute a learning machine process (e.g., learning machine process 248) that is configured to detect potential network attacks, such as a DoS attack. Assume for illustrative purposes that an attack node/device launches an attack targeted at node 42, as shown in FIG. 5A. As a result of the attack, the performance of the communication link between nodes 42 and 31 may change (e.g., by affecting the amount of packet loss along the link, by increasing number of requests originating from node 42, by increasing delays, etc.). In such a case, the learning machine process executed by node 31 may analyze the changes and determine that a potential attack has been detected, as shown in FIG. 5B. In response, as shown in FIG. 5C, node 31 may generate and send an alert 508 to a supervisory device such as the network FAR/Root, NMS, or other such device via which corrective measures may be taken (e.g., by alerting a human operator of the potential attack, instituting routing changes, etc.). As will be appreciated, alerts and other corrective measures may also be initiated by any other node in addition to that of node 31, such as node 42, other neighbors of node 42, etc.

The deployment of learning machines within an LLN is not without difficulties. For example, a balance may be needed between generating too few alarms and too many alarms. In the first case, having too few alarms increases the potential for an attack to go undiscovered. In the second case, too many alarms may increase the potential for false positives which may lead to unnecessary corrective measures and unwanted overhead in the network. In addition, the performance of the various learning machines may differ throughout the network (e.g., some devices may receive better or more appropriate training data than others, changing network conditions may lower the effectiveness of a trained model, etc.). Accordingly, it is both challenging and difficult to devise techniques to deploy learning machines throughout a network for purposes of attack detection.

Designating a Voting Classifier Using Distributed Learning Machines

The techniques herein provide voting mechanisms whereby learning machine classifiers distributed across a network collaborate to determine whether a network attack is occurring. In some aspects, a set of potential voters may be identified (e.g., based on the classification tasks that the potential voters can perform, the set of features that they require in order to perform the required task, etc.). During voting, remote learning machine classifiers selected as voters may be provided the set of required features (e.g., data to be classified) and reply with the results of their own classifications of the features. In some aspects, the voters may be selected by taking into account factors such as the characteristics of the requested classification, the potential voting participants, the target classification, the conditions of the network, etc. Thus, in some implementations, the amount of information exchanged in the voting process may be reduced, allowing voting to be performed even in constrained networks, such as in IoT applications. Upon receiving votes from the voters, a learning machine may tally the votes as a final classification result. Such a voting strategy may allow for a classification that is far better and more robust than a classification obtained from a single classifier in the network.

Specifically, possible voting nodes in a network are identified. The possible voting nodes each execute a classifier that is configured to select a label from among a plurality of labels based on a set of input features. A set of eligible voting nodes is selected from among the possible voting nodes based on a network policy. Voting requests are then provided to the eligible voting nodes that cause the eligible voting nodes to select labels from among the plurality of labels. Votes are received from the eligible voting nodes that include the selected labels and are used to determine a voting result.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, any number of learning classification entities (LCEs) may be deployed throughout a network to perform classification tasks. For example, learning machine classifiers such as learning machine process 248 may be deployed to various nodes/devices throughout a network to classify network traffic or other parameters for purposes of detecting DoS attacks. Any number of different types of network devices, such as routers, switches, data centers, or any other computing device that can perform classification tasks, may be deployed as an LCE. One or more network devices (e.g., a router, switch, NMS, network controller, etc.) may also be designated as a voting coordinator (VC) that facilities and coordinates voting among a plurality of LCEs.

The following terms are introduced to aid in the understanding of the techniques herein:

LCE(i): the $i^{th}$ Learning Classification Entity (LCE).

C(i,j): the $j^{th}$ classifier hosted by LCE(i). In other words, LCE(i) may host one or more classifiers. In various embodiments, the types of classifiers (e.g., ANNs, etc.) may also differ on a particular LCE and/or across different LCEs.

F(i,j): the set of input features of classifier C(i,j). For instance, F(i,j)={"input packets/sec", "output packets/sec", "number of open TCP connections"}.

F(i): the whole set of input features available at LCE(i). Note that a classifier C(i,j) may not use all the features in F(i). Thus, F(i,j) used by C(i,j) may be a subset of F(i), in some cases. For instance, F(i)={"input packets/sec", "output packets/sec", "number of open TCP connections", "number of DNS queries/sec"} is one possible set of input features.

L(i,j): the set of labels (e.g., output classes) of C(i,j). For instance, L(i,j)={"Attack", "Normal"} is one possible set of labels that may be used for attack detection.

T(i): the set of one or more IP addresses or other network addresses that are the subject(s) of the classification (e.g., the address of a node that is potentially under attack). For instance, once a DoS jamming attack against a node has been detected by the classifier of a FAR, this classification could be corroborated by the voting mechanism involving other FARs that also have access to data regarding the jammed node. In this case, T(i) may be the IPv4 or IPv6 address of the node under the jamming attack. Note that in the case of classifiers that classify more complex events, IP addresses may need a complement to correctly identifying the targets. Indeed, in the case of non-IoT networks, if a classifier detects a slow HTTP DoS attack and a vote is launched, T(i) may include the IP address and the TCP port of the HTTP server under attack.

An LCE may initiate a vote for any number of different reasons. For example, an LCE may initiate a vote due to the detection of a positive output of a classifier (e.g., a DoS attack has been detected by a classifier), a detected decrease in the performance of the locally hosted classifier, to check whether the performance of the local classifier can be improved, in response to a user request, or for any other such reason.

Note that two different classifiers C(i,j) and C(k,l) participating in a vote may provide the same set of output labels where L(i,j)=L(k,l), but that the input features of these classifiers can be different. For instance, C(i,j) could classify network traffic as "Attack" or "Normal" using number of input packets per second while C(k,l) classify network traffic as "Attack" or "Normal" using the number of output packets per second and the number of HTTP sessions that are open. Similarly, in implementations in which one or more targets T(i) are provided, different types of classifiers may be used as long as they have the same output labels and the LCEs are able to extract their requisite input features from the target (s). For instance, if C(i,j) classifies nodes in a WPAN as being either under normal conditions or under DoS jamming conditions, then C(k,l) may be required to perform the exact same classification, if it is to vote on a result of C(i,j). In another example, if C(i,j) uses as input the mean received signal strength indication (RSSI) and the transmission (TX) success rate during the last minute of the targeted node(s) T(i), LCE(i) must be able to pull this information from T(i), to place a vote. Similarly, if C(k,l) uses the expected transmission count (ETX) as an input feature, for instance, LCE(k) must also be able to pull the ETX from T(i), in order to vote. Furthermore, the machine learning processes used for each classifier participating in the voting does not need to be necessarily the same. For instance, C(i,j) can be based on ANNs and C(k,l) can be based on Support Vector Machines (SVMs), in one embodiment.

—Discovery of Possible LCE Voters—

An LCE may first discover possible voters (e.g., other devices also executing classifiers), before conducting a vote. For example, let LCE(i) request a vote for its classifier C(i,j). According to various embodiments, the discovery may be performed by a VC, which can be a network device with full knowledge about the elements of the network, in a centralized implementation (e.g., an NMS, Network Controller, etc.) or can be directly executed by LCE(i) in a decentralized mode.

Figure 6A:
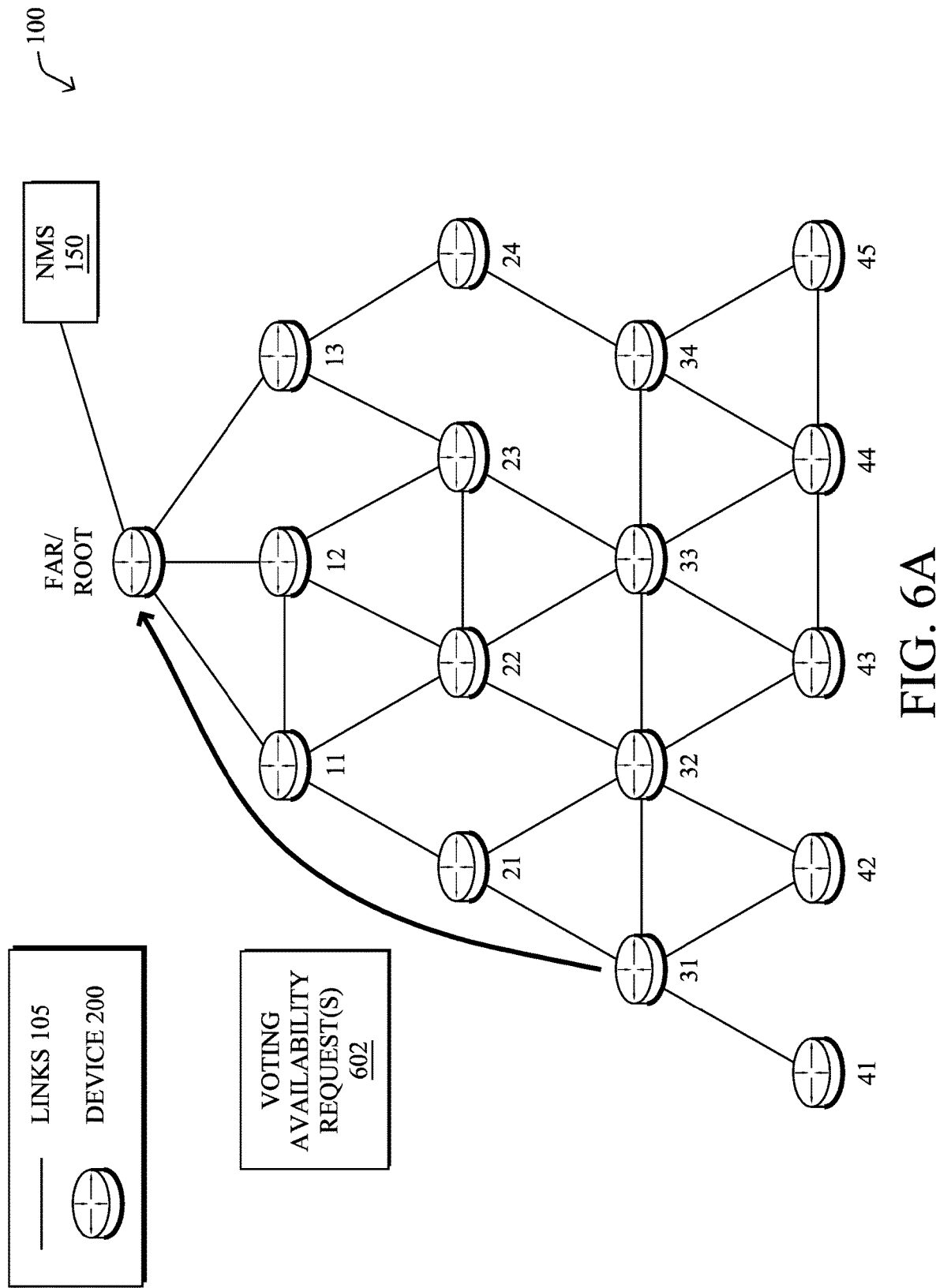
FIGS. 6A-6C illustrate an example of a centralized approach to identifying potential voting nodes.

When a centralized approach is taken, an LCE may send a voting availability request to a VC. For example, as shown in FIG. 6A, LCE(i)/node 31 may send one or more voting availability requests 602 to the FAR or to NMS 150. The address of the responsible VC may be statically configured or dynamically discovered using a protocol extension such as DNS, DHCP or the routing protocol itself. In various embodiments, voting availability request 602 may be a new IPv4 or IPv6 message that includes any or all of the following type-length-values (TLVs):

1) L(i,j)—The availability request may specify the set of labels that any potential classifiers/voters must use. For example, {"Attack", "Normal"}. In other words, only classifiers that use the specified labels may be potential voters, in some embodiments.
2) F(i)—Optionally, the set of features that the requestor (e.g., LCE(i)) can provide to other participants of the vote may be included in the voting availability request. Note that if LCE(i) is interested in excluding from the vote classifiers that use a certain feature, it can just remove these features from F(i). For instance, if LCE(i) can provide features {"input packets/sec", "output packets/sec", "number of open TCP connections", "number of DNS queries/sec"}, but for some reason (for instance confidentiality) it does not want to send values of the "number of open TCP connections" to other LCEs, it can just remove this feature from the list in F(i).
3) T(i)—Optionally, the target or targets of the classification may be included in the voting availability request. For instance, {2001:DB8:DEAD:BEEF: CAFE::FED, 2001:DB8:DEAD:BEEF:CAFE::CBA} may be included in one such request. Note that the targets may be as large as the entire set of nodes in a WPAN. In another embodiment, the requesting node may list of a set of nodes that are flagged as strategic in the network, nodes that have been attacked in the past, or any other nodes of interest. Note also that such a list may be updated dynamically.

Figure 6B:
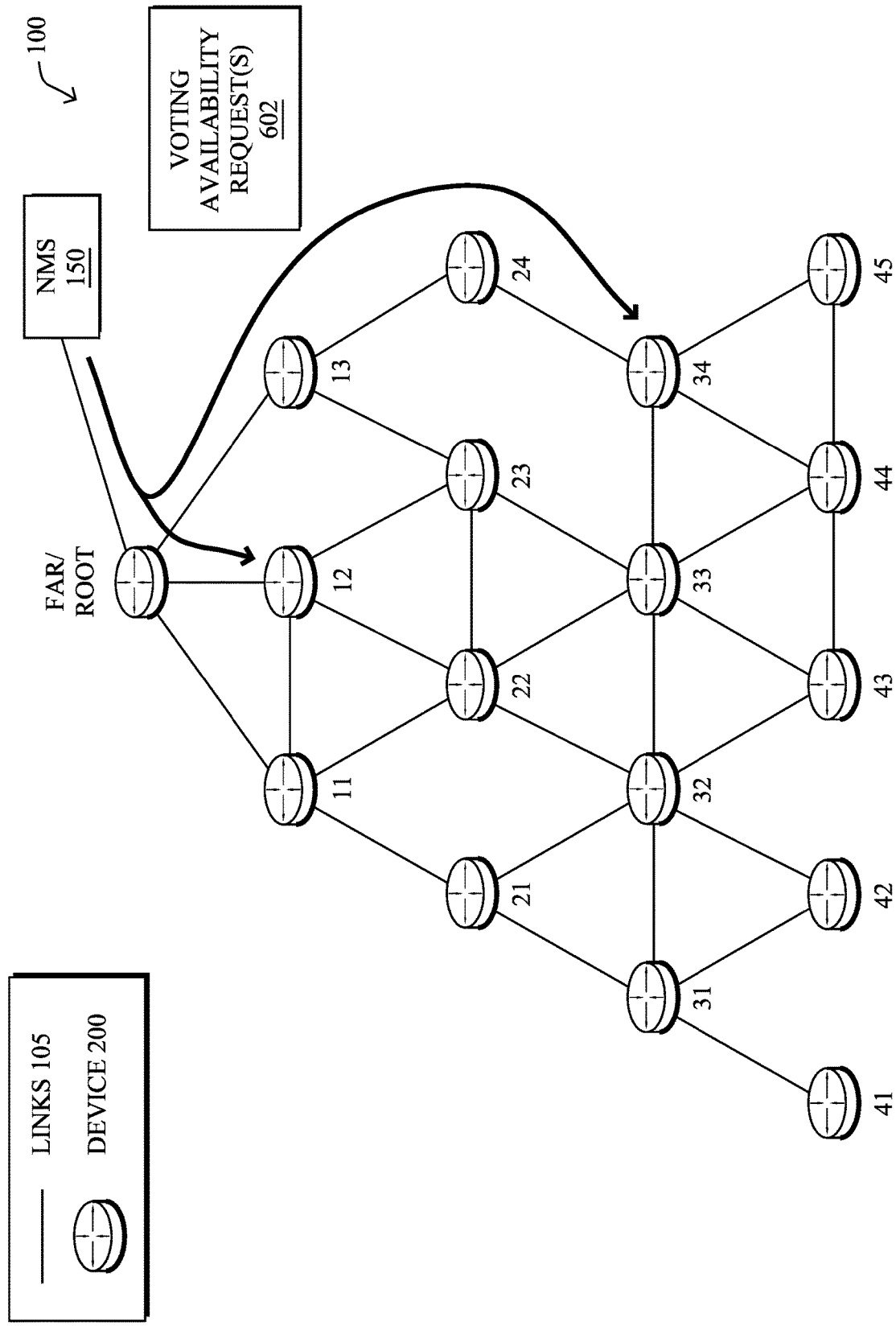
Figure 6C:
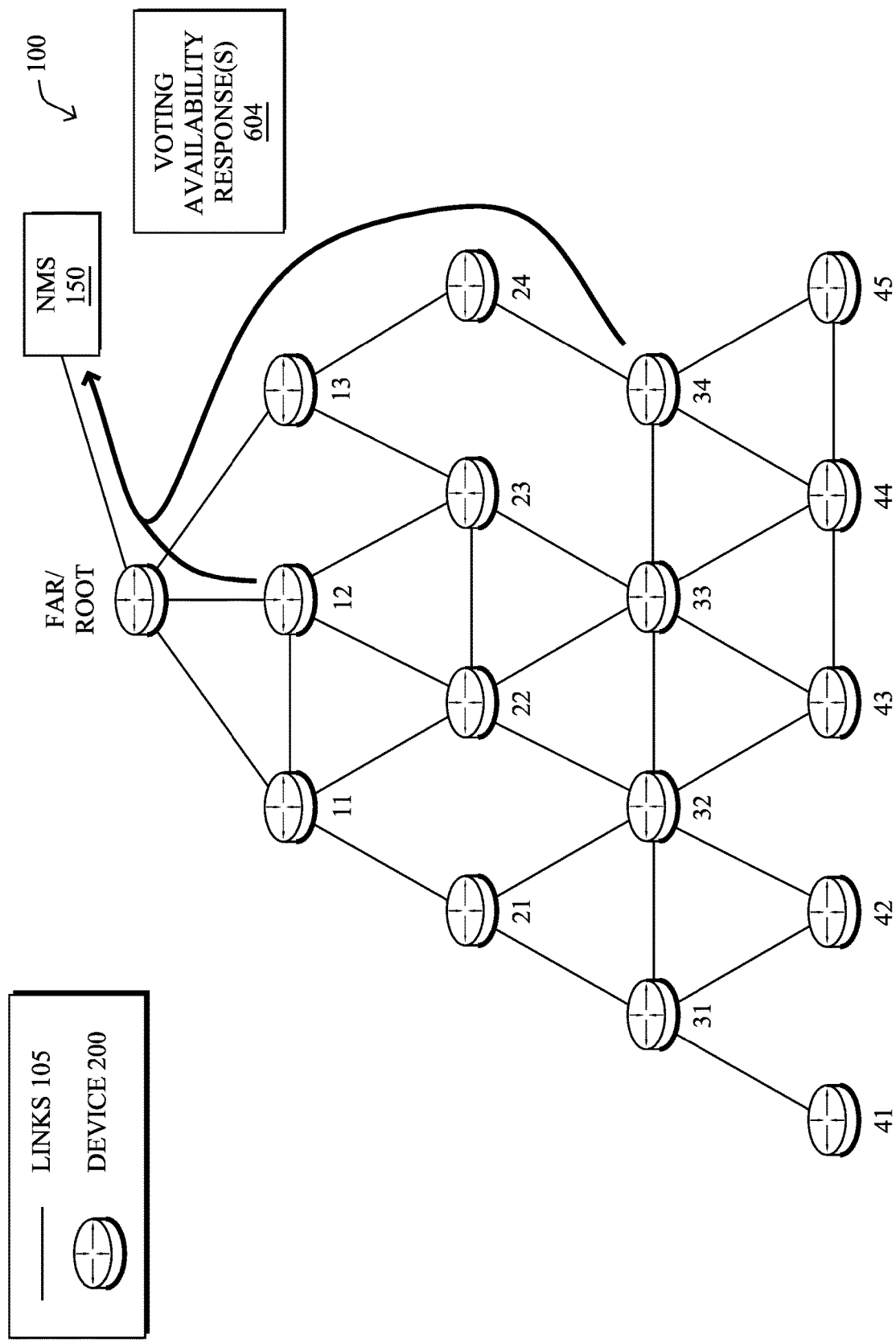

In response to receiving a voting availability request, the VC may forward the request to any or all LCE candidates or perform the check locally. For example, as shown in FIG. 6B, NMS 150 (or another device designated as the VC, such as the FAR) may forward voting availability requests 602 to nodes 12 and 34. On reception of a voting availability request, a receiver then checks whether it has one or more classifiers C(k,l) that satisfy the requested conditions (e.g., L(k,l)=L(i,j)) and whose F(k,l) is contained within F(i). If the optional TLV containing F(i) was not sent in the voting availability request message, this last condition is not checked. If the classifier of the polled LCE satisfies the conditions specified in voting availability request 602, the device may send a voting availability response back to the VC. For example, as shown in FIG. 6C, nodes 12 and 34 may send voting availability responses 604 back to NMS 150, which is acting as the VC in this example.

In various embodiments, voting availability response 604 may include any or all of the following TLVs:

1) F(k,l)—In some implementations, an LCE may respond with the set of features (e.g., "ETX", "RX Success rate", "RSSI," etc.) required by its classifier(s) that satisfy the conditions of voting availability request 602. In some cases, only identifiers (IDs) for the features may be included, not the actual values of the features (e.g., samples). This information may be important in implementations where the LCE that initiates the voting has to provide the values of these features to the voting participant. These features may also be used, in some cases, to select voters that use different feature sets, to provide robustness among the actual voters.

2) LCE(k) Addresses—In some implementations, the list of addresses of LCEs with classifiers satisfying the conditions may be included in a voting availability response. For example, in the centralized VC case, the list of addresses of LCEs with classifiers satisfying the conditions may be used later on by the LCE that sent the voting availability request to bypass the VC.
3) Classifier Performance Metrics—In some cases, a responding LCE may include metrics regarding how well its classifier(s) perform. Such metrics may include, but are not limited to, a recall or sensitivity value, a false positive rate, or other metrics that may be used to select which LCEs actually vote.
4) A "No Voting Available" Indicator—In cases in which a given LCE is not able to perform the requested vote, the voting availability response may indicate that this is the case (e.g., the voting availability response may be a "no voting available" message). For example, if the classifier(s) of the responding LCE do not satisfy the conditions in the voting availability request, the responding LCE may indicate that it is not able to participate in the vote.

Note that in the centralized case (e.g., a voting availability request is sent via unicast to a central VC), the central VC may already have knowledge of the various LCEs in the network and their characteristics (e.g., their input features, output labels, etc.) that are visible to the VC. If so, the VC itself may generate and send a corresponding voting availability response to the requesting LCE. If this is not the case, the central VC may otherwise forward voting availability requests to the LCE for which it does not have sufficient information, as shown in FIG. 6B. Then, these LCEs will reply with a voting availability response message, which will give to the central VC all of the missing information. The VC may then respond to the requesting LCE with an appropriate voting availability response.

Figure 7A:
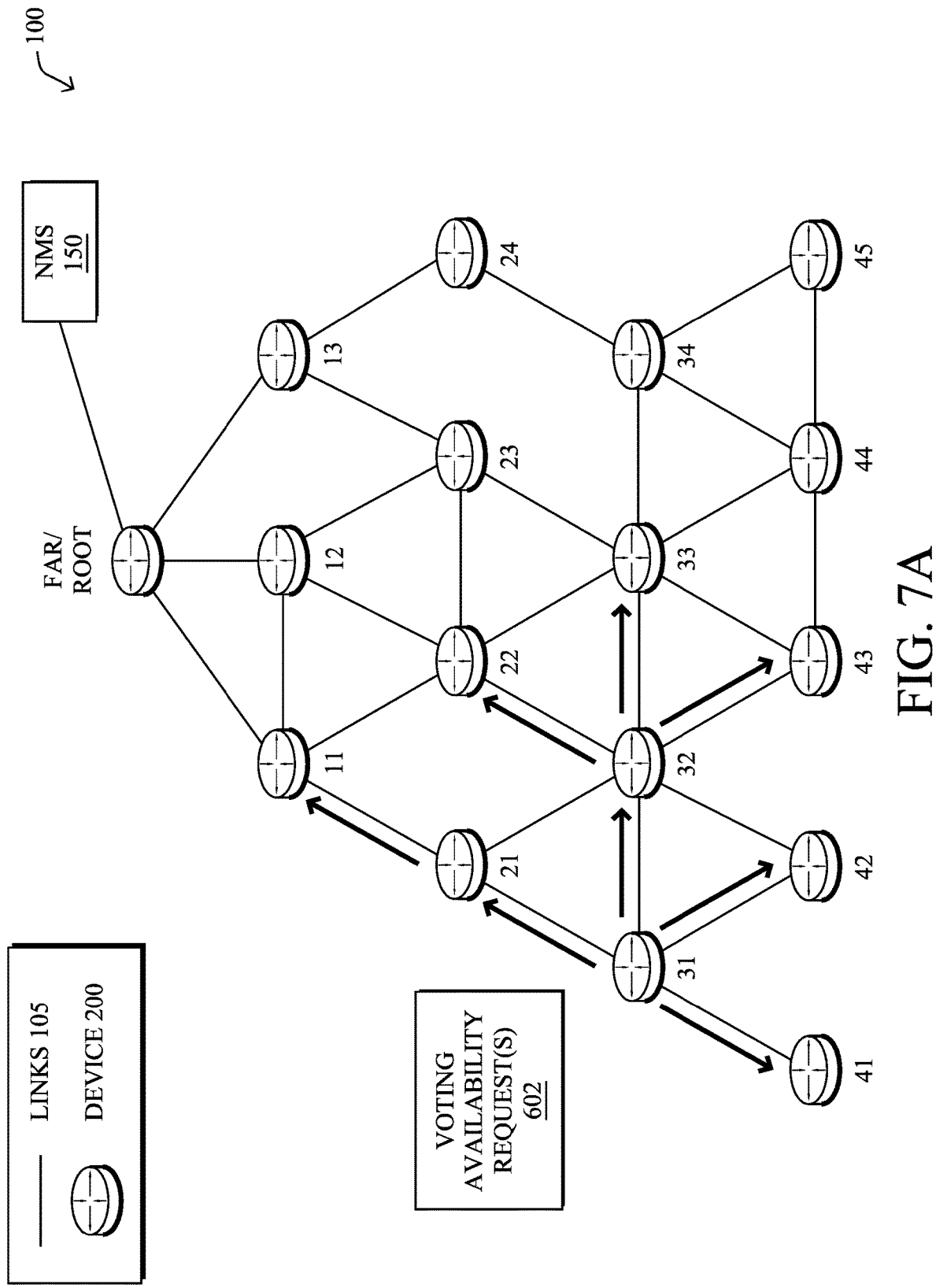
FIGS. 7A-7B illustrate an example distributed approach to identifying potential voting nodes.
Figure 7B:
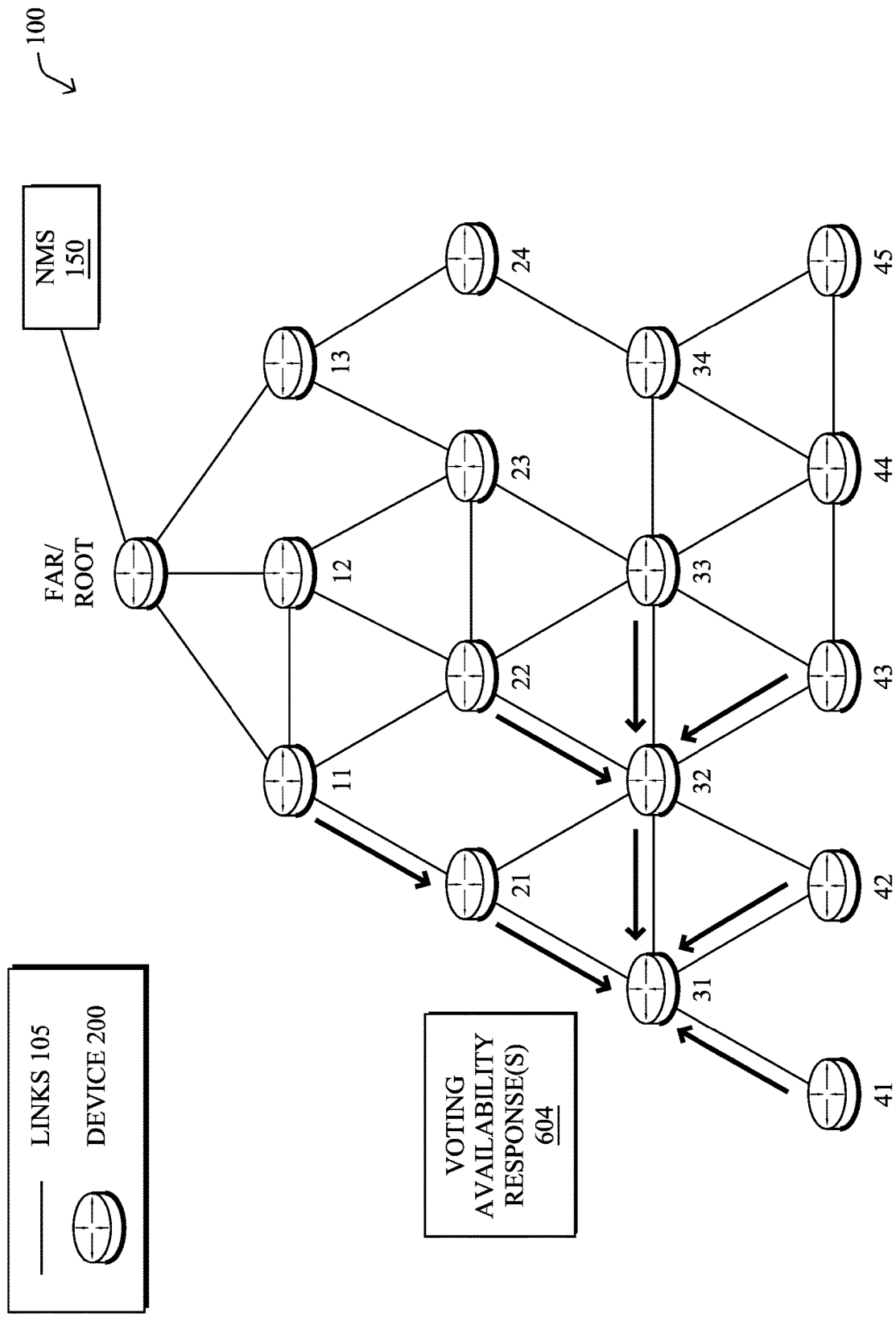

According to other embodiments, an LCE may send a voting availability request as a multicast message to other LCEs as part of a decentralized approach. For example, the requesting LCE may send a multicast message to all or a set of routers (e.g., using a well-known multicast group). In one embodiment, the LCE may receive the list from an NMS or other supervisory device that has information regarding which other nodes have classifiers installed. For example, as shown in FIG. 7A, node 31 may send voting availability requests 602 to any number of other nodes/LCEs. In response, as shown in FIG. 7B, the LCEs may send voting availability responses 604 back to the requesting LCE based on whether or not their classifier(s) satisfy the conditions in the voting availability requests. Notably, a VC may not be used in implementations in which voting availability requests are multicast by a requesting LCE.

As noted above, the conditions specified in a voting availability request may differ in various implementations. In many implementations, the primary condition that is checked is whether a polled LCE executes a classifier that uses the same labels as that in the voting availability request. In some implementations, another condition may relate to the features used. For example, if the voting availability request specifies a set of input features that may be supplied later on by the requesting LCE to the responding LCE, the responding LCE may determine whether or not any of its classifiers also use those features. In another example, if one or more target addresses are specified in conjunction with a set of input features, the responding LCE may determine whether or not it already has those features or can access those features from the targeted device(s). Advantageously, such an implementation may reduce or even eliminate traffic associated with providing the input features to the voters, making this implementation well suited for applications in constrained networks, such as LLNs.

—Selecting Voters—

Various conditions may make a possible voter unavailable or unsuitable to participate in a vote. For example, current network load conditions, future forecasted traffic conditions, confidentiality issues, and the like may make a particular LCE unavailable to the initiating LCE. Accordingly, techniques are described herein that allow for eligible voters to be selected from a set of possible voters (e.g., voters that satisfy the conditions of a voting availability request). Doing so may also ensure against indirect information leaks. For example, a malicious LCE could otherwise use the voting mechanism to probe the reaction of a particular classifier to different kinds of traffic. In greater detail, an attacker may try to see how the attack detection infrastructure of a network would classify a given attack profile (e.g., the malicious node may try to have a set of classifiers vote on features representing a number of attacks, until it finds an attack profile which goes undetected). Another example could be a malicious peer trying to infer the details of the traffic mix observed by another router by observing (e.g., through a set of voting requests) whether certain traffic profiles are classified as regular or anomalous by a particular router.

Figure 8A:
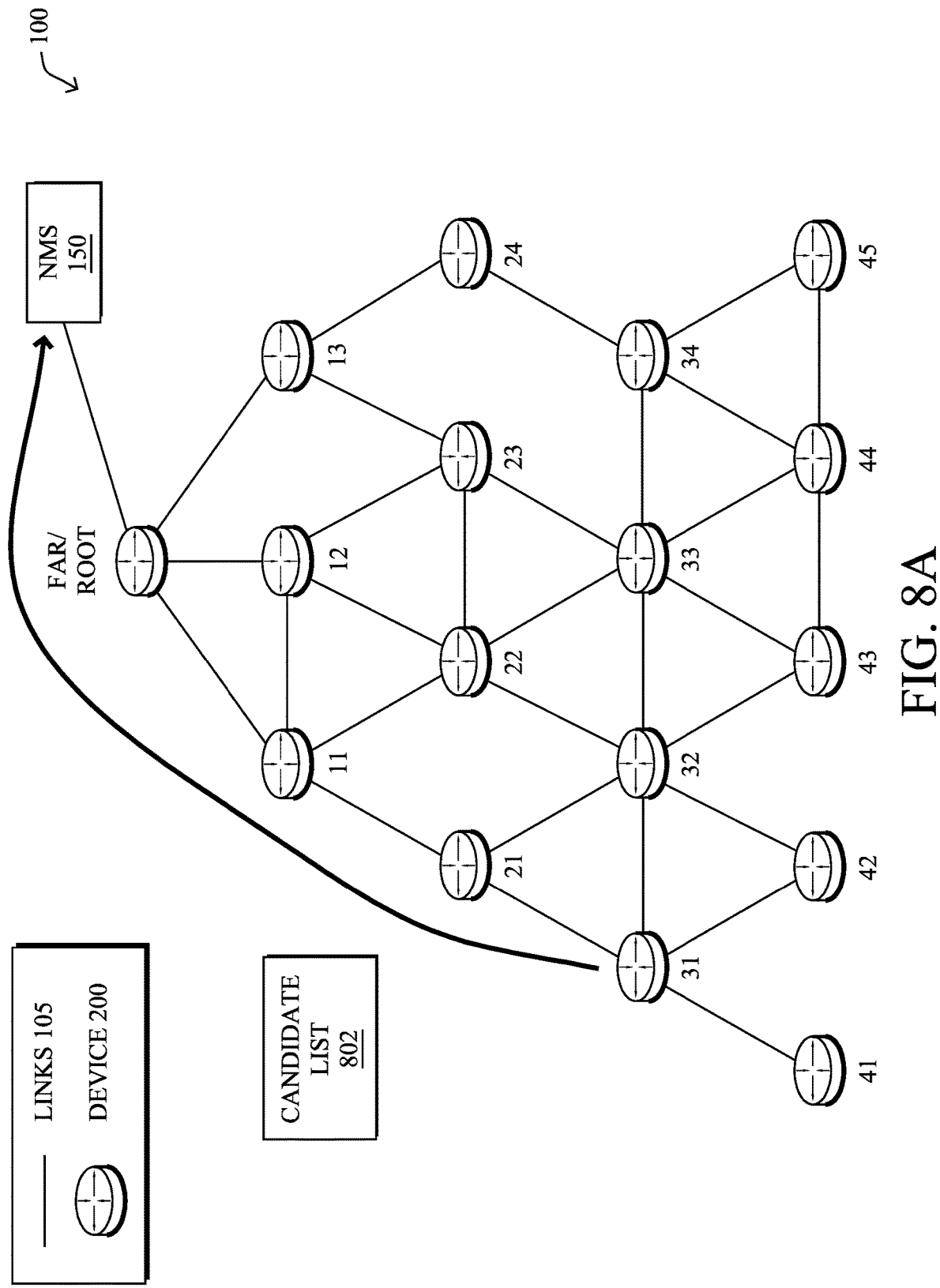
FIGS. 8A-8C illustrate an example of a network policy being used to select eligible voting nodes.

The availability or not of a LCE is determined via a policy engine that can be co-located with a LCE, co-located with a VC or may be an independent element of the network, according to various embodiments. For example, as shown in FIG. 8A, a candidate list 802 may be sent from a requesting LCE to a policy engine, such as NMS 150. In some embodiments, candidate list 802 may be an IPv4 or IPv6 message containing one or more of the following TLVs:

1) L(i,j)—The set of labels that the classifier must provide. For instance, the set {"Attack", "Normal"} may be included.
2) LCE(k) Addresses—In some implementations, the list of addresses of LCEs with classifiers satisfying the conditions may be included in a voting availability response. For instance, the set of addresses {192.0.2.27, 198.51.100.231, 2001:DB8:DEAD:BEEF:CAFE:DB1:DB2:DB3} may be included in the candidate list.
3) F(k,l)—In some implementations, the set of input features to be used (e.g., "ETX", "RX Success rate", "RSSI," etc.) may be included in the candidate list. For instance, 1{"input packets/sec", "output packets/sec"}, {"input packets/sec", "number of DNS queries/sec"}, {"number of open TCP connections"}} may be included in the list. In some embodiments, only the IDs of the input features are sent, not the actual values of the features (e.g., no actual samples/measurements are transferred).
4) Classifier Performance Metrics—In some cases, the performance metrics of the voting candidates may also be included (e.g., recall values, precision values, false positive rates, etc.). This information may be used in some implementations to exclude low performing candidates from the vote and/or to optimize the voting pool.
5) T(i)—In some implementations, the address or addresses of the targeted nodes under analysis may be included. Such information may be used, for example, to select voters that already have, or have access to, the features needed to make a classification regarding the attacked node(s).

Figure 8B:
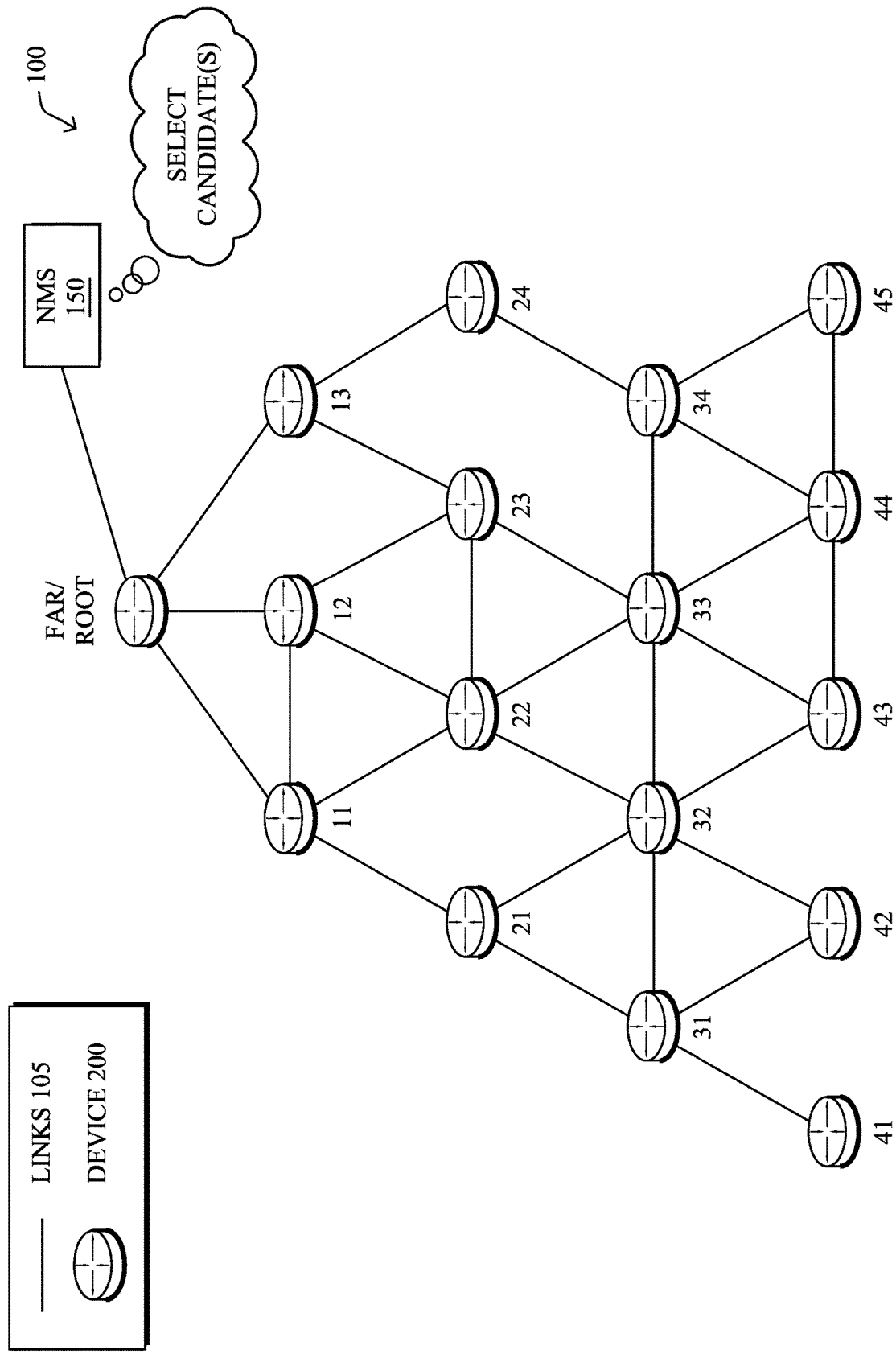
Figure 8C:
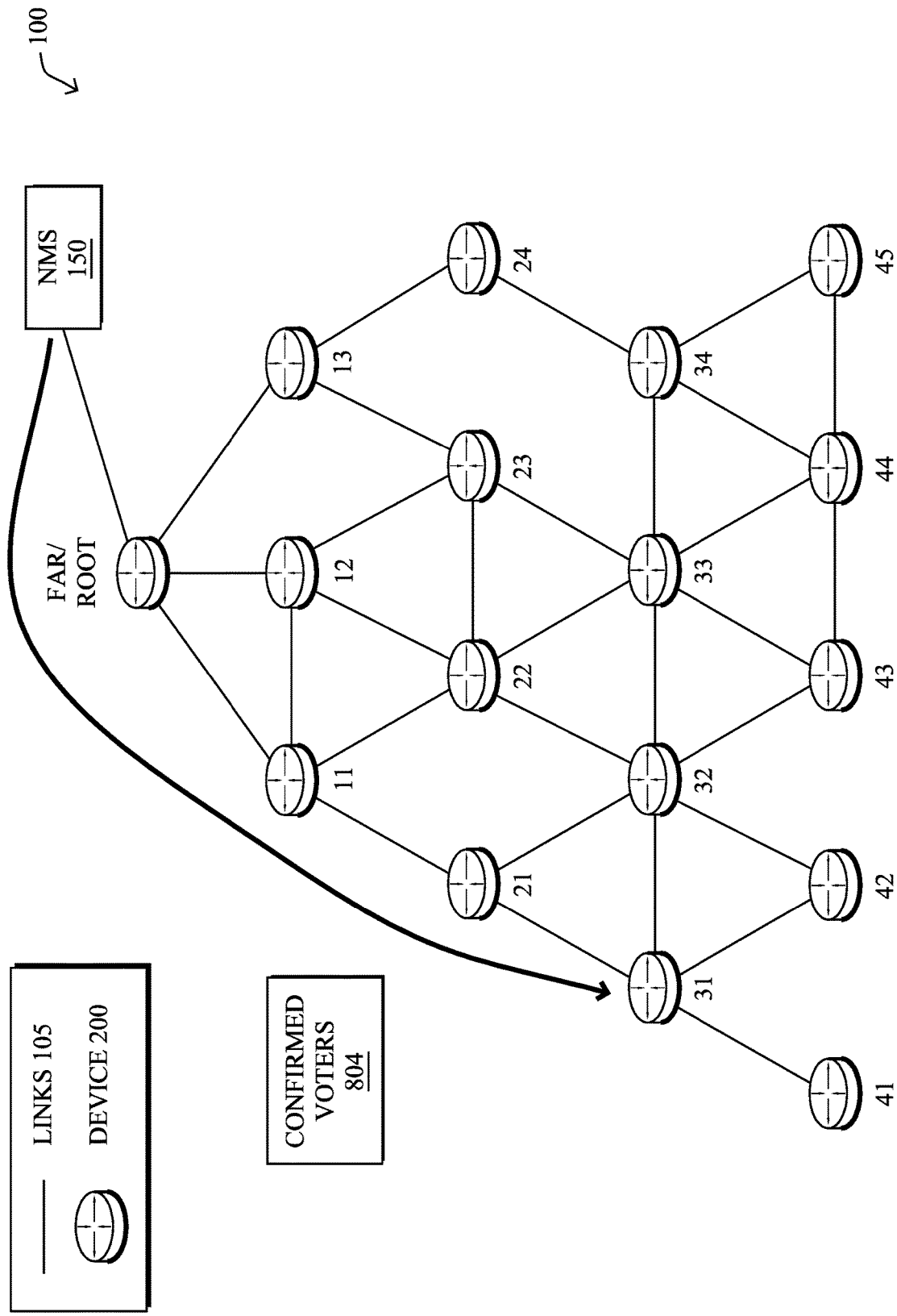

Upon reception of this message, the policy engine checks whether the candidate LCEs can participate in the requested voting and replies to the requesting LCE with a list of confirmed voters. For example, as shown in FIGS. 8B-8C, NMS 150 may analyze candidate list 802 to select eligible voters from among the possible voters. In response, the policy engine may send a confirmed voters message 804 back to the requesting LCE. Such a message may be, for example, an IPv4 or IPv6 message containing the list of LCE addresses that are eligible voters.

As will be appreciated, voting availability and eligibility messages (e.g., messages 602, 604, 802, 804) may not be sent, in some implementations. For example, in a decentralized mode (e.g., voting availability requests are multicast), the requesting LCE may perform the selection of eligible voters locally without having to send the candidate list to a remote policy engine. In some centralized implementations, the selection of eligible voters from among possible voters may also be performed locally by a VC. In such a case, the VC may perform policy check and only include eligible voters in the voting availability response 604 sent back to the requesting LCE. In other words, the mechanisms herein may be optional in some embodiment, depending on the request strategy used (e.g., centralized vs. decentralized) and which devices in the network perform the various functions of the voting process (e.g., the location of the VC, the policy engine, etc.).

In one embodiment, the policy engine may also be leveraged to enforce strict identity checking of the LCE requesting a vote. In particular, the policy engine could require the LCE sending the candidate list message to prove its identity (e.g., by using a handshaking infrastructure such as PKI). For example, the policy engine may only respond to a properly signed candidate list message. By verifying the identity of the LCE, various network policies may also be enforced, such as limiting the number of features allowed for a certain LCE, making a subset of LCEs available only to clients belonging to a particular administrative domain, etc. In addition, the policy engine may select eligible voters so as to optimize the voting process (e.g., in addition to, or in lieu of, selecting voters based on other considerations). For example, eligible voters may be selected in one embodiment based on the voters executing different types of classifiers (e.g., the input features of the classifiers may differ), to provide diversity to the voting pool.

—Voting—

Figure 9A:
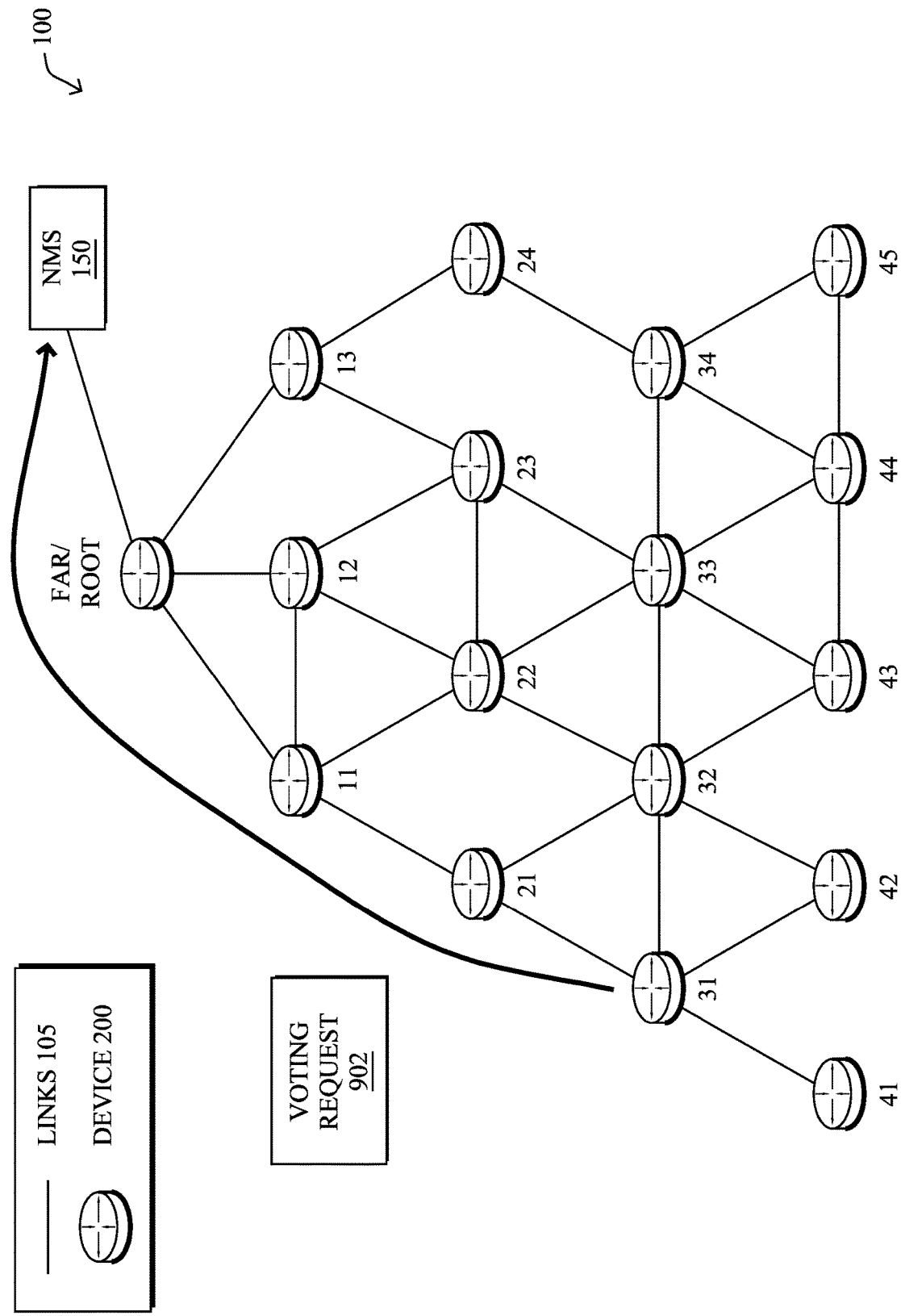
FIGS. 9A-9C illustrate examples of a vote being requested.
Figure 9B:
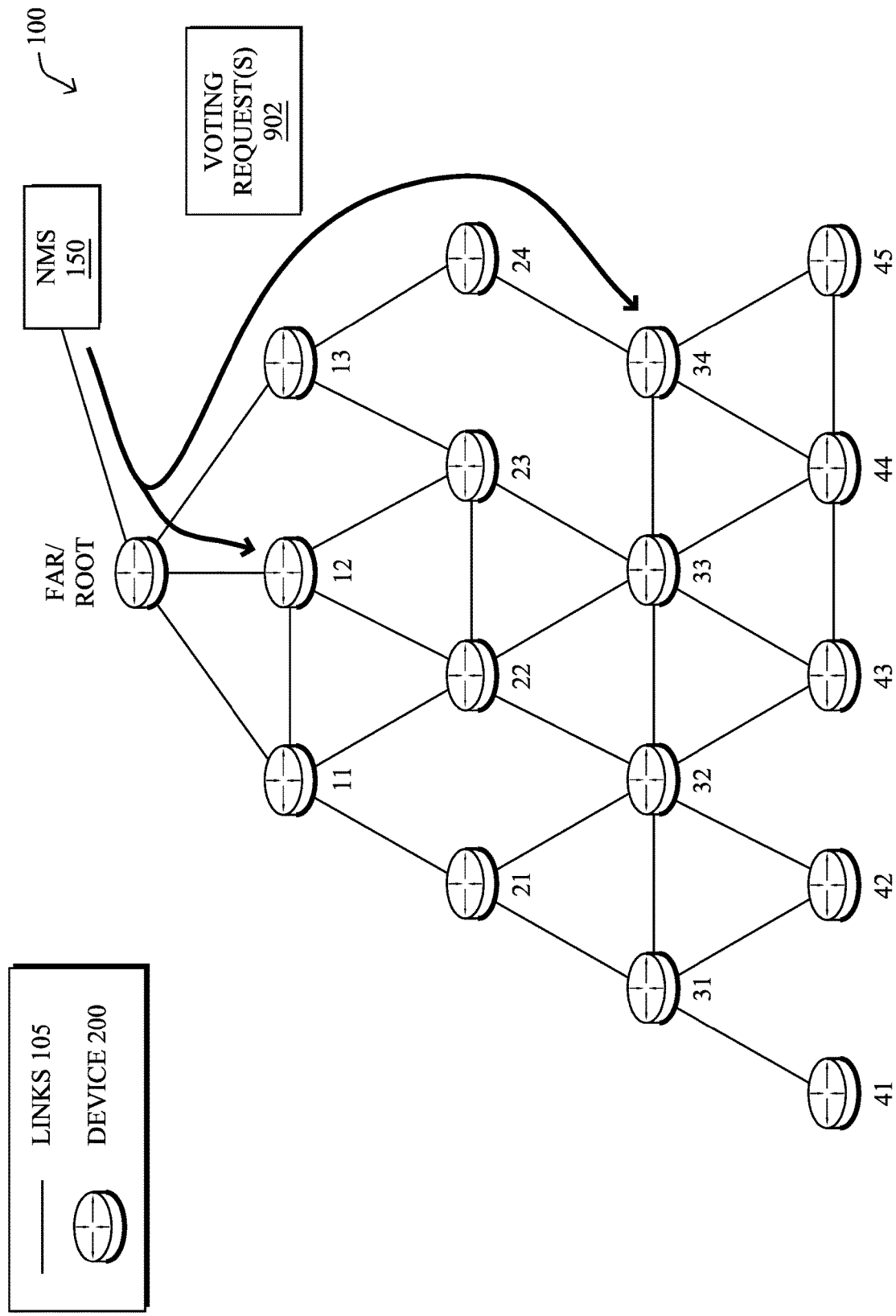

Once the pool of eligible voters has been determined, the requesting LCE may use this set to verify or validate its own classification results, assuming the set is non-empty. In other words, actual voting may not be performed unless one or more eligible voters have been designated. In various embodiments, voting may be performed in a centralized manner or a decentralized manner. For example, as shown in FIGS. 9A-9B, a voting request 902 may be sent to the centralized VC (e.g., the FAR/Root, NMS 150, etc.). In various embodiments, voting request 902 may be an IPv4 or IPv6 message that includes one or more of the following TLVs:

1) L(i,j)—The set of expected labels. For instance, the set {"Attack", "Normal"} may be included in a voting request.
2) F(k,l) Values—In some implementations, values for the set of input features indicated in messages 602 or 802 may be provided as part of the voting request. If several samples are to be classified at the same time, sets of values can be specified here. For instance, if the number of packets per second (nps) and the number of HTTP connections (nhc) are the input features to be classified, {nps_1, nhc_1} may be sent to perform the voting on a single observation. However, if N observations are to be classified via voting, nps_1, nhc_1, nps_2, nhc_2, . . . nps_N, nhc_N} may be sent. Notably, sending the actual feature set to be classified may increase network usage (e.g., bandwidth, etc.) and may be best suited for networks that have higher capabilities (e.g., including the feature values may negatively impact the performance of LLNs and other constrained networks).
3) F(k,l)—In some cases, the voting request may also include the features for which corresponding values are also sent. For example, a voting request may include the set {"Number of packets per second", "Number of HTTP Connections"}.
4) A Compatibility Flag—In some cases, a voting request may indicate that the receiving LCEs have already been verified as compatible with the voting process.
5) A signature—In cases in which the policy engine validates the requesting LCE, the voting request may be signed by the policy engine. Thus, if a voting request is not properly signed, it may be ignored by the receiving LCE.
6) T(i)—A voting request may, in some implementations, include the address or addresses of the targeted nodes under analysis. Such information may be used by a voter to retrieve the feature values to be used by its local classifier, preferably from a local memory. In contrast to including the feature values to be used within a voting request, which may affect network performance, using data that is entirely local or partially local to a voting LCE may lower the impact on the network. Thus, such an approach may be well suited for use in networks with limited resources, such as LLNs.

In a centralized mode, the requesting LCE may send a voting request to the VC, which then forwards the request on to the eligible voters. For example, as shown in FIG. 9B, the VC (e.g., NMS 150, the FAR/Root, etc.) may forward on voting requests 902 to the eligible voters.

Figure 9C:
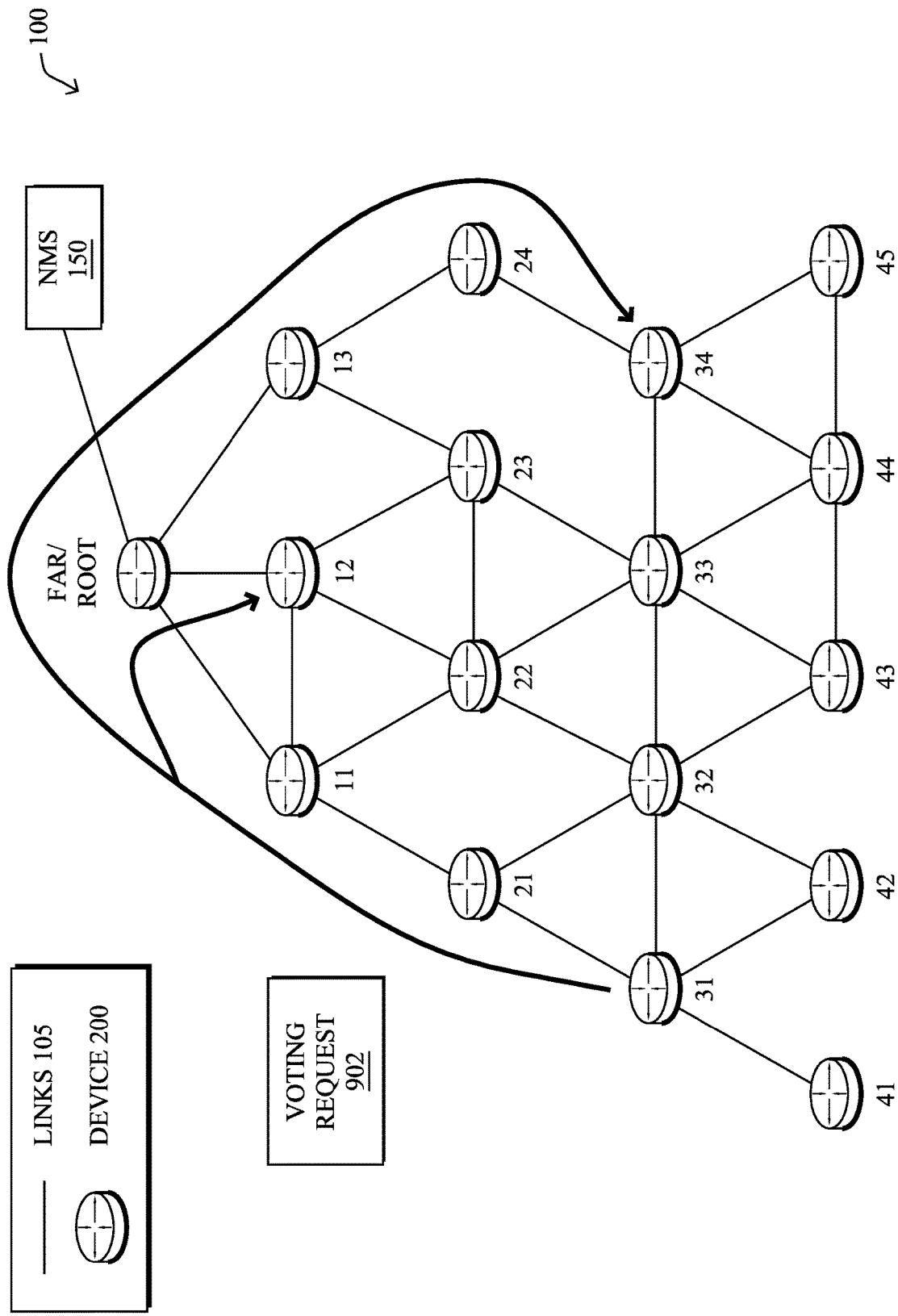

In a decentralized mode, voting requests may be multicast directly to the eligible voters. For example, as shown in FIG. 9C, the requesting LCE may send voting requests 902 as multicast messages directly to the eligible voters, if the voters are known (e.g., a new multicast group may be formed using the set of selected voters).

Figure 10A:
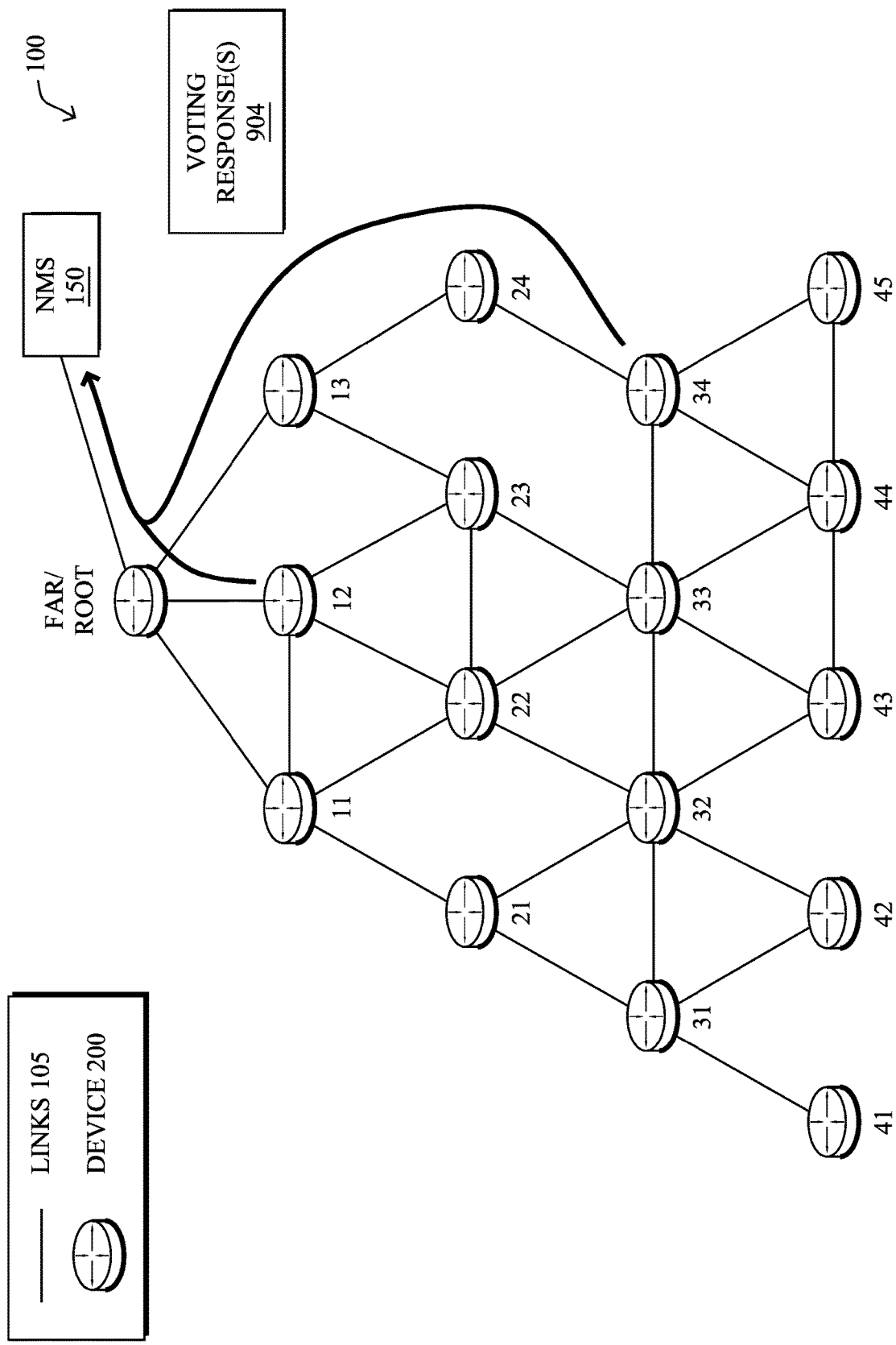
FIGS. 10A-10D illustrate examples of votes being collected and used to determine a voting result.
Figure 10B:
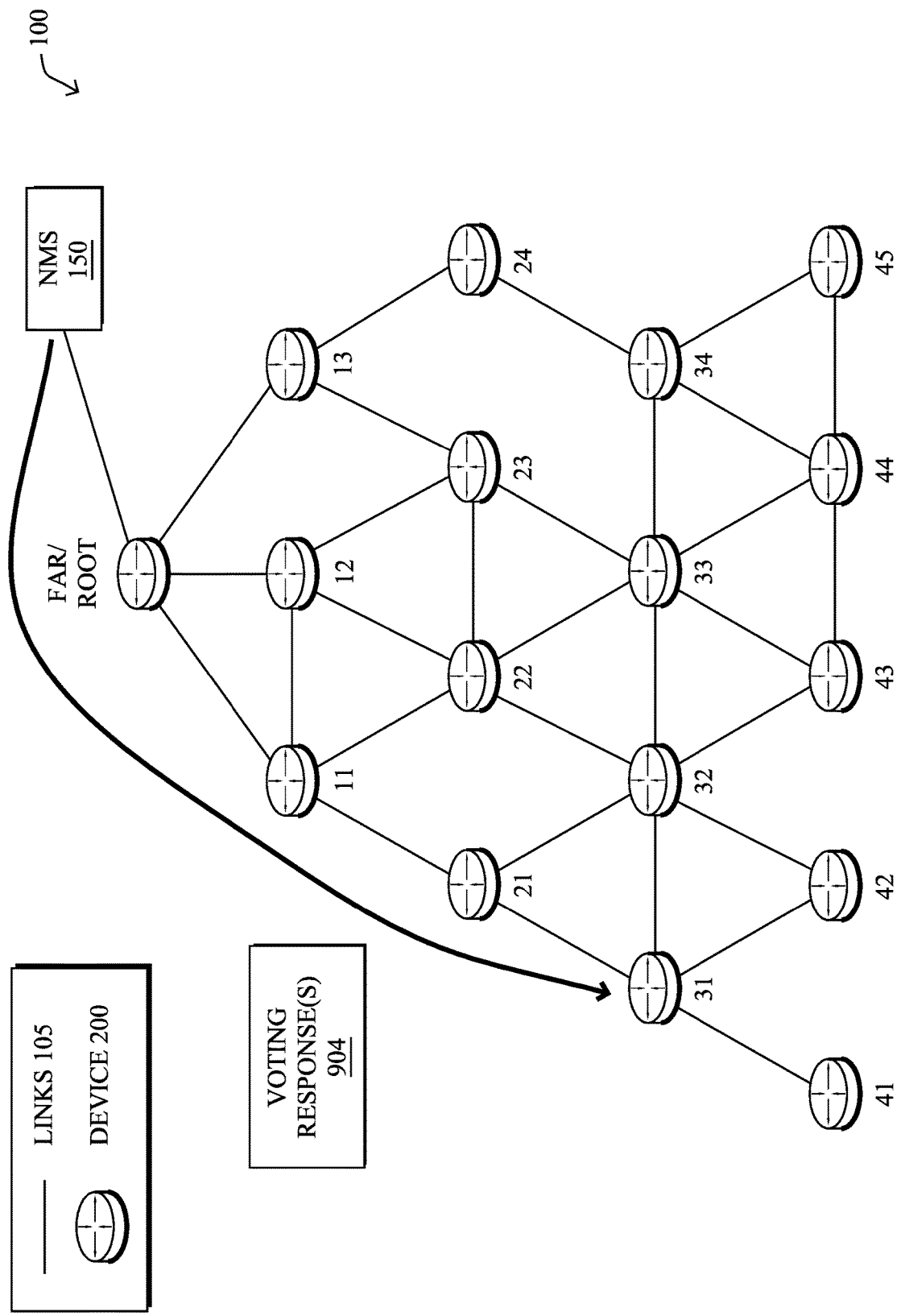
Figure 10C:
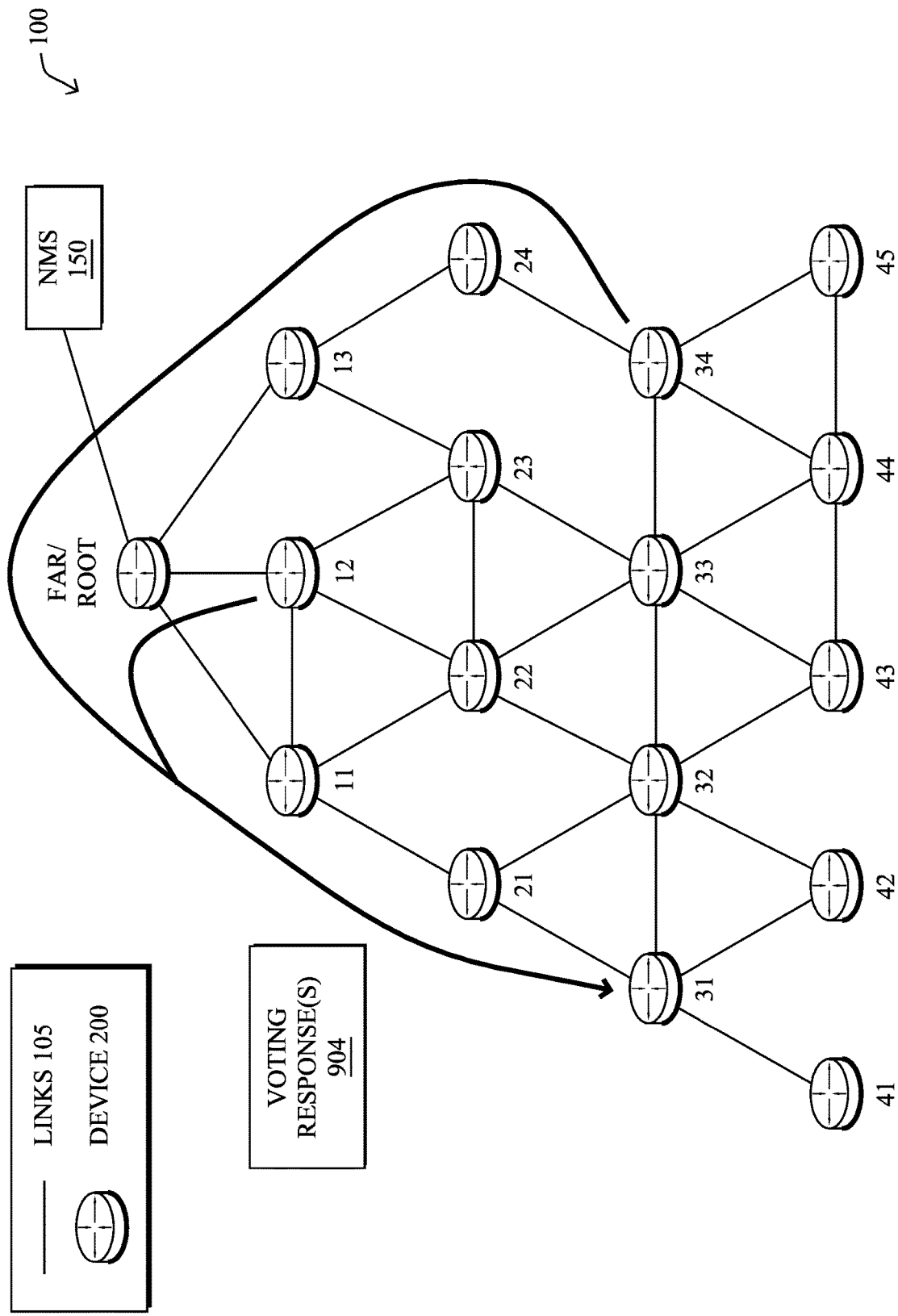

In response to receiving a voting request (e.g., voting request 902), each LCE may perform the requested classification. In one embodiment, the set of feature values (e.g., observations) included in the voting request may be classified. In another embodiment, feature values regarding any targets indicated in the voting request may be used to label the targets. A voting LCE may then reply with a voting reply message to either the VC (e.g., in a centralized mode) or directly to the requesting LCE (e.g., in a decentralized mode). For example, as shown in FIGS. 10A-10B, voting responses 904 may be returned to the VC (e.g., NMS 150, the FAR, etc.) and forwarded on to the requesting LCE (e.g., node 31). Conversely, in a decentralized mode, voting responses 904 may be sent directly back to the requesting LCE, as illustrated in FIG. 10C. Voting response 904 may, in some cases, be an IPv4 or IPv6 message that includes one or more of the following TLVs:

1) Assigned Labels—A voting response message may include the label(s) assigned by the voting classifier to each observation in the voting request. Alternatively, the voting response may include the label(s) assigned by the voting classifier to the target(s) indicated in the voting request.
2) Confidence Values—In some cases, a voting response may also include one or more confidence measurements regarding the assigned labels. Such information may be used, for example, by the requesting LCE to discard or weight votes during the final tally.

Figure 10D:
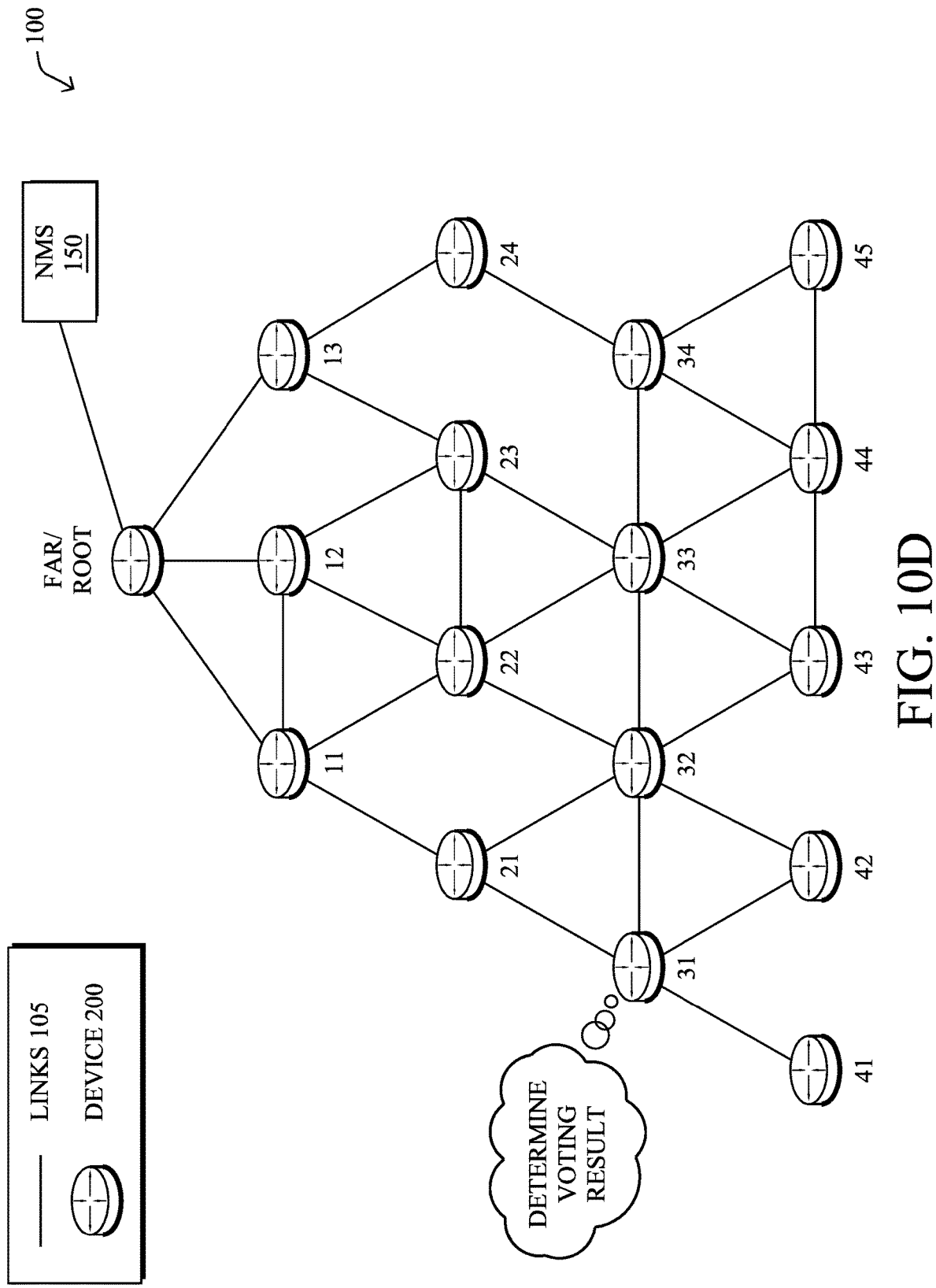

Once all of the voting responses are received by the requesting LCE, the final classification is determined by the LCE based on the votes (e.g., the labels included in the voting responses) and, in some cases, on the confidence values associated with the votes. For example, as shown in FIG. 10D, the requesting LCE (e.g., 31) may use the voting responses to determine a final classification result. In one embodiment, majority voting may be used to determine the voting result. For instance, assume that an LCE requests that four other LCEs classify a feature set or target node as having either the "Normal" label or the "Attack" label. If majority voting is used, the requesting LCE may only determine that an attack is present if three or more LCEs have applied the "Attack" label (e.g., including the label from the originating LCE). In other embodiments, different voting strategies may be used such as unanimous voting (e.g., if the voting results may result in drastic countermeasures being taken), weighted voting (e.g., based on the confidence values indicated in the voting responses, or based on an optimal number of voters (e.g., to provide a tradeoff between the overall recall and precision of the final tally).

Figure 11:
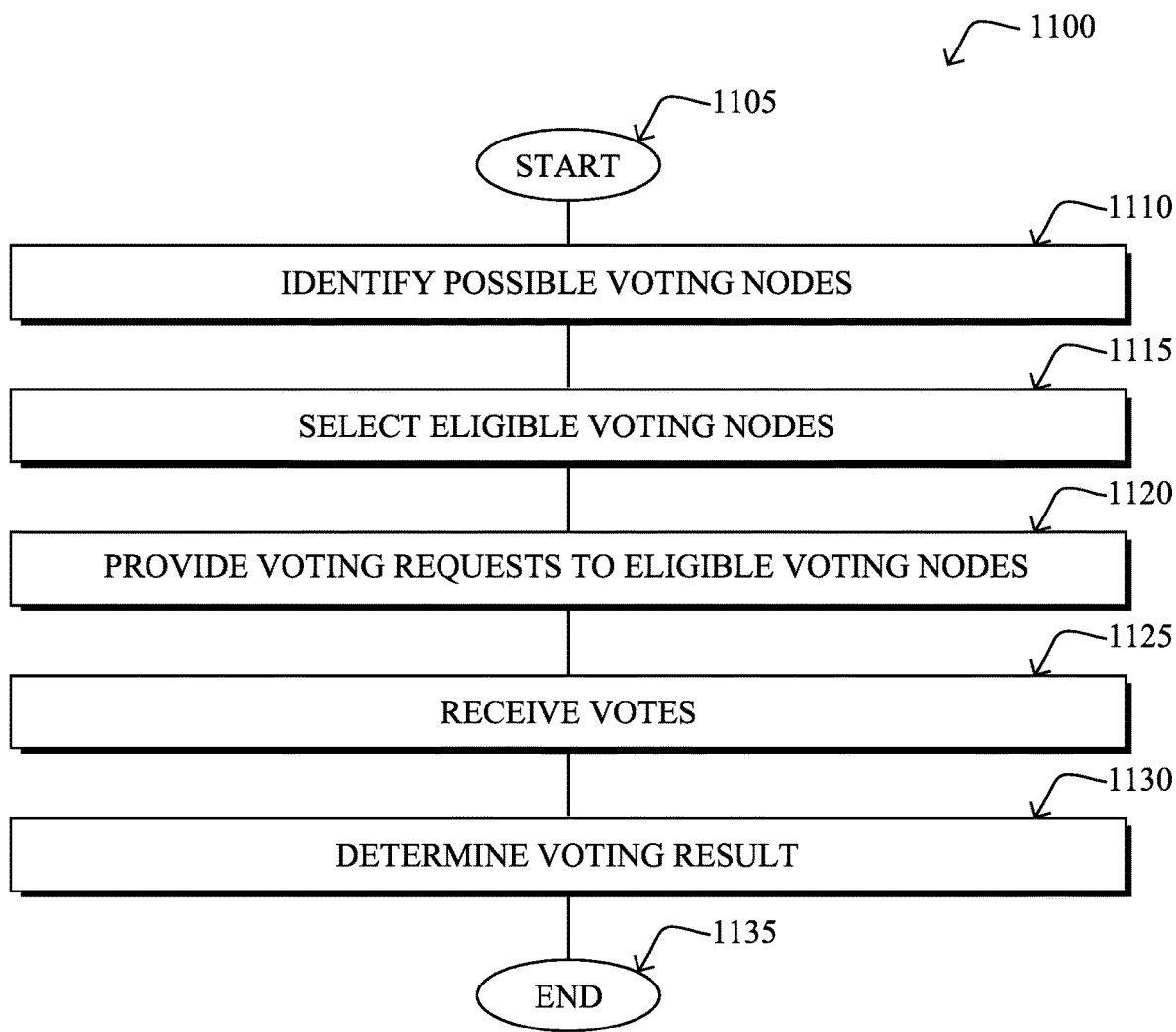
FIG. 11 illustrates an example simplified procedure for conducting a vote among learning machines in a network.

FIG. 11 illustrates an example of a simplified procedure for conducting a vote among learning machines in a network, in accordance with one or more embodiments described herein. The procedure 1100 may start at step 1105, and continues to step 1110, where, as described in greater detail above, a set of possible voting nodes is identified. In general, the possible voting nodes correspond to nodes that execute classifiers that satisfy a set of conditions. For example, the possible voting nodes may execute classifiers that use the same set or subset of labels as the classifier executed by a requesting device. In one embodiment, another condition may be that a possible voting node has access to data regarding one or more target nodes under analysis. In another embodiment, a further condition may be that a classifier on a possible voting node uses a particular set of input features. According to various embodiments, possible voting nodes may be identified by sending a request to a central voting coordinator (VC) that forward requests on to other devices or, alternatively, by multicasting requests to a set of devices.

At step 1115, a set of one or more eligible voting nodes is selected from among the possible voting nodes, as described in greater detail above. In general, an eligible voting node refers to a possible voting node (e.g., a node that satisfies the conditions of a voting availability request), that also satisfies one or more additional conditions. The additional conditions may include, for example, policies imposed by a policy engine. For example, the policy engine may select voters/classifiers that use different sets of input features, to provide robustness to the voting result. In another example, the policy engine may select voters based on current or predicted network conditions (e.g., so as to minimize the effects of the vote on the network), based on whether or not the identity of the requesting node has been confirmed, to optimize the set of voters, or other such policies. In various embodiments, the selection of eligible voters may be performed locally by the requesting device, the VC, or by requesting that another device (e.g., an NMS, network controller, etc.) determine the set of eligible voters.

At step 1120, one or more voting requests are provided to the eligible voting nodes, as highlighted above. In a centralized implementation, a voting request may be provided to a VC and forwarded on to the eligible voters. In a decentralized implementation, voting requests may be multicast directly to the eligible voters. In general, a voting request includes all of the information needed by a receiving device to participate in the voting process. For example, a voting request may include labels, input feature data such as feature values (e.g., observations made by the requesting node), a set of one or more target nodes to be classified (e.g., the voter is asked to determine whether or not a particular node is under attack), or any other such information.

At step 1125, votes are received via voting responses, as described in greater detail above. In general, the voting responses may include one or more labels selected by the classifiers of the voters for a set of input features and/or for a set of target nodes indicated in a voting request. In another embodiment, a vote may simply contain an indication as to whether the voter validated a particular classification or set of classifications. In some cases, a vote may also include a confidence measure that quantifies the degree of confidence a voter has in its vote.

At step 1130, as detailed above, a voting result is determined by tallying the received votes. Various approaches may be taken to determine the voting result such as majority rules, using weighted votes (e.g., weighting the votes using accompanying confidence measures), requiring a unanimous consensus, or the like. In some cases, a node that requests a vote may also provide a vote used in the determination. For example, assume that a particular node has determined that an attack may be present. Votes cast by other nodes may then be tallied by the node to determine whether an attack is actually present or was a false positive. Once a voting result has been determined, procedure 1100 then continues on to step 1135 and ends.

It should be noted that while certain steps within procedure 1100 may be optional as described above, the steps shown in FIG. 11 is merely for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for improved classifier performance in a network by combining the outputs of compatible classifiers hosted by different network devices. Note that these classifiers may consider the same classification classes but they can be designed using different machine learning techniques, such as ANN, SVM, naive Bayes, etc., and even different input features. In the case of DoS detection, a classifier may assign a "Normal" or "Attack" label to certain traffic features. In such cases, the techniques herein can improve the performance of the classification in comparison to that of a single classifier, thereby also improving the DoS detection performance.

While there have been shown and described illustrative embodiments that provide for validating the detection of a network attack, it is to be understood that various other adaptations and modifications may be made within the spirit and scope of the embodiments herein. For example, while the techniques herein are described primarily with respect to attack-detection classifiers, the techniques herein may also be used to vote on different classification labels. In addition, while the techniques herein are described primarily in the context of an LLN, the techniques herein may be applied more generally to any form of computer network, such as an enterprise network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a device from another device in a computer network, an availability request that requests the device discover a plurality of eligible voting nodes to participate in a vote to validate a classification result of the another device, wherein the availability request specifies a set of labels each of the plurality of eligible voting nodes must use to validate the classification results of the another device;
discovering, by the device, a plurality of possible voting nodes in the computer network before conducting the vote, wherein each of the plurality of possible voting nodes executes at least one classifier that is configured to select a label from among a plurality of labels as an output based on a set of input features;
dynamically selecting, by the device from among the plurality of possible voting nodes, a subset of the plurality of possible voting nodes as the plurality of eligible voting nodes based on the set of labels in the availability request;
sending, by the device, voting requests only to the selected plurality of eligible voting nodes, wherein the voting requests cause the plurality of eligible voting nodes to vote on the validity of the classification result;
receiving, at the device, the votes from the selected plurality of eligible voting nodes that include the selected labels; and
validating, by the device, the classification results of the another device based on a voting result received from the selected plurality of eligible voting nodes.

2. The method as in claim 1, wherein the availability request is sent as multicast messages.

3. The method as in claim 1, wherein the availability request specifies a set of one or more target nodes to be classified.

4. The method as in claim 1, wherein the plurality of possible voting nodes are further selected based on a threshold number of the plurality of possible voting nodes in a particular administrative domain that may be included in the plurality of eligible voting nodes.

5. The method as in claim 1, wherein a policy engine on the device limits the set of input features used by a particular node in the plurality of eligible voting nodes.

6. The method as in claim 1, wherein the voting requests include values for the set of input features.

7. The method as in claim 1, wherein the received votes include confidence values associated with the selected labels, and wherein the voting result is determined by weighting the votes using the confidence values.

8. The method as in claim 1, wherein one or more classification tasks executing on at least one of the plurality of eligible voting nodes are configured to determine whether a denial of service (DoS) attack is present in the computer network.

9. The method as in claim 1, wherein the voting requests include identifiers for the set of input features that cause the plurality of eligible voting nodes to retrieve values for the set of input features and to use the retrieved values to generate the labels.

10. An apparatus, comprising:
one or more network interfaces to communicate with a computer network;
a processor coupled to the network interfaces and adapted to execute one or more processes; and
a memory configured to store a process executable by the processor, the process when executed operable to:
receive an availability request that requests the apparatus discover a plurality of eligible voting nodes to participate in a vote to validate a classification result of another device in the computer network, wherein the availability request specifies a set of labels each of the plurality of eligible voting nodes must use to validate the classification results of the another device;
discover a plurality of possible voting nodes in the computer network before conducting the vote, wherein each of the plurality of possible voting nodes executes at least one classifier that is configured to select a label from among a plurality of labels as an output based on a set of input features;
select, from among the plurality of possible voting nodes, a subset of the plurality of possible voting nodes as the plurality of eligible voting nodes based on the set of labels in the availability request;
send voting requests only to the selected plurality of eligible voting nodes, wherein the voting requests cause the plurality of eligible voting nodes to vote on the validity of the classification result;
receive votes from the selected plurality of eligible voting nodes that include the selected labels; and
validate the classification results of the another device based on a voting result received from the selected plurality of eligible voting nodes.

11. The apparatus as in claim 10, wherein the availability request is sent as multicast messages.

12. The apparatus as in claim 10, wherein the availability request specifies a set of one or more target nodes to be classified.

13. The apparatus as in claim 10, wherein the plurality of possible voting nodes are further selected based on a threshold number of plurality of possible voting nodes in a particular administrative domain that may be included in the plurality of eligible voting nodes.

14. The apparatus as in claim 10, wherein a policy engine limits the set of input features used by a particular node in the plurality of eligible voting nodes.

15. The apparatus as in claim 10, wherein the voting requests include values for the set of input features.

16. The apparatus as in claim 10, wherein the received votes include confidence values associated with the generated labels, and wherein the voting result is determined by weighting the votes using the confidence values.

17. The apparatus as in claim 10, wherein one or more classification tasks executing on at least one of the plurality of eligible voting nodes are configured to determine whether a denial of service (DoS) attack is present in the computer network.

18. The apparatus as in claim 10, wherein the voting requests include identifiers for the set of input features that cause the plurality of eligible voting nodes to retrieve values for the set of input features and to use the retrieved values to generate the labels.

19. A tangible, non-transitory, computer-readable media having software encoded thereon, the software when executed by a processor operable to:
   receive an availability request that requests the apparatus discover a plurality of eligible voting nodes to participate in a vote to validate a classification result of another device in the computer network, wherein the availability request specifies a set of labels each of the plurality of eligible voting nodes must use to validate the classification results of the another device;
   discover a plurality of possible voting nodes in the computer network before conducting the vote, wherein each of the plurality of possible voting nodes executes at least one classifier that is configured to select a label from among a plurality of labels as an output based on a set of input features;
   select, from among the plurality of possible voting nodes, a subset of the plurality of possible voting nodes as the plurality of eligible voting nodes based on the set of labels in the availability request;
   send voting requests only to the selected plurality of eligible voting nodes, wherein the voting requests cause the plurality of eligible voting nodes to vote on the validity of the classification result;
   receive votes from the selected plurality of eligible voting nodes that include the selected labels; and
   validate the classification results of the another device based on a voting result received from the selected plurality of eligible voting nodes.

20. The tangible, non-transitory, computer-readable media as in claim 19, wherein the plurality of possible voting nodes are further selected based on a threshold number of the plurality of possible voting nodes in a particular administrative domain that may be included in the plurality of eligible voting nodes.

* * * * *